(12) United States Patent
Kakutani

(10) Patent No.: US 7,612,911 B2
(45) Date of Patent: Nov. 3, 2009

(54) IMAGE PROCESSING DEVICE AND IMAGE PROCESSING METHOD FOR PERFORMING CONVERSION OF COLOR IMAGE DATA

(75) Inventor: Toshiaki Kakutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 595 days.

(21) Appl. No.: 10/549,663

(22) PCT Filed: Mar. 17, 2004

(86) PCT No.: PCT/JP2004/003603
§ 371 (c)(1),
(2), (4) Date: Sep. 16, 2005

(87) PCT Pub. No.: WO2004/084540
PCT Pub. Date: Sep. 30, 2004

(65) Prior Publication Data
US 2006/0181720 A1    Aug. 17, 2006

(30) Foreign Application Priority Data
Mar. 19, 2003   (JP) ............................. 2003-076071

(51) Int. Cl.
*H04N 1/40* (2006.01)
(52) U.S. Cl. ........................ 358/1.9; 382/243
(58) Field of Classification Search .................. 358/1.9, 358/2.1, 3.14–3.15; 382/199–200, 166, 232–233, 382/243–244
See application file for complete search history.

(56) References Cited

U.S. PATENT DOCUMENTS 5,359,438 A    10/1994   Maeda (Continued)

FOREIGN PATENT DOCUMENTS

CN    1348153    5/2002

(Continued)

OTHER PUBLICATIONS

Abstract of Japanese Patent Publication No. 08-202881, Pub. Date: Aug. 9, 1996, Patent Abstracts of Japan.

(Continued)

*Primary Examiner*—Thomas D Lee
*Assistant Examiner*—Stephen M Brinich
(74) *Attorney, Agent, or Firm*—Martine Penilla & Gencarella, LLP

(57) ABSTRACT

The purpose of the image processing device is to convert color image data rapidly to data expressed by the dot on/off state. A plurality of adjacent pixels is grouped as a first type of block, and judgment of the dot on/off state performed by suitably using the error diffusion method is performed in block units. The image data after the color conversion used for this judgment is stored once in memory in a compressed state according to the result of edge detection for the block, and when necessary, judgment of the dot on/off state is performed while reading from the memory. The image processing device realizes the judgment rapidly while avoiding making more complex the judgment of the dot on/off state performed in block units. Also, the image data is compressed according to the result of edge detection, so it is possible to read and write rapidly in relation to memory, and furthermore to decompress rapidly. The image processing device rapidly performs the process of color converting color image data and converting data expressed by the dot on/off state without making the processing contents more complex.

17 Claims, 19 Drawing Sheets

U.S. PATENT DOCUMENTS

| | | | |
|---|---|---|---|
| 5,524,067 | A | 6/1996 | Miyake et al. |
| 5,729,625 | A | 3/1998 | Miyake |
| 5,838,455 | A | 11/1998 | Imaizumi et al. |
| 6,047,087 | A | 4/2000 | Imaizumi et al. |
| 6,201,612 | B1 | 3/2001 | Matsushiro et al. |

FOREIGN PATENT DOCUMENTS

| | | |
|---|---|---|
| JP | 03-053767 | 3/1991 |
| JP | 05-324815 | 12/1993 |
| JP | 06-121175 | 4/1994 |
| JP | 06-125464 | 5/1994 |
| JP | 08-202881 | 8/1996 |
| JP | 08-307691 | 11/1996 |
| JP | 11-027666 | 1/1999 |
| JP | 11-227263 | 8/1999 |
| JP | 2001-298622 | 10/2001 |
| JP | 2002-064713 | 2/2002 |
| JP | 2002-185788 | 6/2002 |
| JP | 2003-087570 | 3/2003 |
| JP | 2003-162382 | 6/2003 |

OTHER PUBLICATIONS

Abstract of Japanese Patent Publication No. 2002-185788, Pub. Date: Jun. 28, 2002, Patent Abstracts of Japan.

Damera-Venkata et al., "FM Halftoning via Block Error Diffusion," *Proc. IEEE International Conference on Image Processing*, vol. 2, pp. 1081-1084, Thessaloniki, Greece, Oct. 7-10, 2001.

Abstract of Japanese Patent Publication No. 11-027666, Pub. Date: Jan. 29, 1999, Patent Abstracts of Japan.

Abstract of Japanese Patent Publication No. 11-227263, Pub. Date: Aug. 24, 1999, Patent Abstracts of Japan.

Abstract of Japanese Patent Publication No. 03-053767, Pub. Date: Mar. 7, 1991, Patent Abstracts of Japan.

Abstract of Japanese Patent Publication No. 05-324815, Pub. Date: Dec. 10, 1993, Patent Abstracts of Japan.

Abstract of Japanese Patent Publication No. 06-121175, Pub. Date: Apr. 28, 1994, Patent Abstracts of Japan.

Abstract of Japanese Patent Publication No. 06-125464, Pub. Date: May 6, 1994, Patent Abstracts of Japan.

Abstract of Japanese Patent Publication No. 08-307691, Pub. Date: Nov. 22, 1996, Patent Abstracts of Japan.

Abstract of Japanese Patent Publication No. 2001-298622, Pub. Date: Oct. 26, 2001, Patent Abstracts of Japan.

Abstract of Japanese Patent Publication No. 2002-064713, Pub. Date: Feb. 28, 2002, Patent Abstracts of Japan.

Abstract of Japanese Patent Publication No. 2003-087570, Pub. Date: Mar. 20, 2003, Patent Abstracts of Japan.

Abstract of Japanese Patent Publication No. 2003-162382, Pub. Date: Jun. 6, 2003, Patent Abstracts of Japan.

MAIN SCAN DIRECTION

SUB SCAN DIRECTION

COMPRESSION
INFORMATION: 11

COMPRESSION
INFORMATION: 10

COMPRESSION
INFORMATION: 01

COMPRESSION
INFORMATION: 00

IMAGE PROCESSING DEVICE AND IMAGE PROCESSING METHOD FOR PERFORMING CONVERSION OF COLOR IMAGE DATA

FIELD OF TECHNOLOGY

The present invention relates to technology for converting color image data, and more specifically relates to technology for, after color converting image data according to a first color system to image data of a second color system, converting the data after the color conversion to image data of an expression format according to the dot on/off formation which represents the presence or absence of dot.

BACKGROUND TECHNOLOGY

Printing devices for printing images by forming dots on a printing medium such as an inkjet printer or the like are widely used as output device of image equipment such as computers, digital cameras, and the like. Also, in recent years, various output devices are starting to be used that display images by forming bright spots on a screen such as liquid crystal, organic LED, or the like, and it is thought that these will be widely used in the future.

To display images on computers or digital cameras using these output devices, it is necessary to perform image processing called color conversion processing and halftone processing on the image data. This is because the color image data expression method differs as shown below by the image data creation side (computer or the like) and the image display side based on the image data (printing device or the like).

First, the method for expressing hue differs by the device for performing image processing such as a computer or the like and by the device for performing image output such as a printing device or the like. Specifically, with a computer or the like, in comparison to expressing hues by combining components for color expression of R (red), G (green), and B (blue), with a printing device, hues are expressed using a combination of C (cyan), M (magenta), and Y (yellow), specifically, inks for absorbing other color light. In this way, the hue expression format using the colors RGB is sometimes called the RGB color system. In comparison to this, the hue expression format using the colors CMY as a base is sometimes called the CMY color system. Also, if we look closely even in cases of using the same RGB color system such as with an LED, organic LED, a computer or the like, in almost all cases, there is a subtle difference in the color of the colors RGB. Therefore, even when using the same RGB color system, to correct the difference in colors, it is necessary to convert the color image data. In this way, to express color images such as of a computer or digital camera or the like with the correct hue, it is necessary to convert the color image data expressed by the color system used with the image processing device side such as a computer or the like to the color image data according to the color system used on the side of the printing device or the like. The color conversion process is the process of performing this kind of conversion.

The method of expressing gradations is also different between the image processing device such as a computer or the like and the output device such as a printing device or the like. Specifically, with a computer or the like, pixels, which are the minimum unit of an image, can express many gradations with that individually, for example if there is 1 byte of image data, it is possible to express 256 gradations with each pixel individually. In comparison to this, with a printing device or an image display device, basically, there are only two states of whether or not dots or bright spots are formed, and therefore, pseudo expression of gradations done by changing the formation density of the dots or bright spots is the method that is mainly used. From this fact, a process is needed for converting image data that can express many gradations for each pixel (gradation image data) to image data that is pseudo expressed in gradations (pseudo gradation image data). Halftone processing is a process for performing this kind of conversion.

Various procedures have been proposed for the halftone processing procedure, but there is a procedure called the error diffusion method that is representative of these. The error diffusion method is a procedure whereby errors in the gradation expression that occur by dots being formed or by dots not being formed on the pixel of interest are diffused and stored in unjudged pixels at the periphery of the pixel of interest, and for judging the dot on/off state for the unjudged pixels, a judgment is made for the dot on/off state so as to eliminate error diffused from the peripheral pixels. With the error diffusion method, because halftone processing is performed while eliminating the gradation expression errors that occur with peripheral pixels in this way, it is possible to suppress the errors that occur due to conversion and to convert image data with good precision. It is reasonable that with the error diffusion method, each time the error is diffused to peripheral pixels, reading and writing occurs for memory, so it takes time to do the error diffusion process, and therefore there is a tendency for it to take time to display the images.

DISCLOSURE OF THE INVENTION

The purpose of the invention addresses the problems of the prior art described above, and provides technology for shortening the processing time without making the image processing more complex.

In order to address at least part of the problems described above, the following constitution is used for the first aspect of an image processing device of the present invention.

An image processing device for converting color image data expressed by a first color system to image data expressed by a second color system representing each pixel data as a dot on/off state for each color, the image processing device comprising:

a color conversion unit that converts color image data expressed by the first color system to color image data expressed by the second color system;

an edge detection unit that detects an edge existed in a first type of block into which specified adjacent pixels are grouped;

a compressed data storage unit that compresses the color image data of pixels contained in the first type of block for which no edge is detected and stores the compressed color image data in a memory;

a data decompression unit that decompresses the compressed color image data read from the memory to color image data of each pixel and groups specified adjacent pixels into a second type of block; and a dot formation judgment unit that judges in block units for each color of the second color system the dot on/off state for each pixel contained in the block based on the decompressed color image data of pixels grouped into the second type of block.

Also, the first aspect of the image processing method of the present invention corresponding to the image processing device noted above is:

An image processing method for converting color image data expressed by a first color system to image data expressed by a second color system representing each pixel data as a dot on/off state for each color, the image processing method comprising:

converting color image data expressed by the first color system to color image data expressed by the second color system;

detecting an edge existed in a first type of block into which specified adjacent pixels are grouped;

compressing the color image data of pixels contained in the first type of block for which no edge is detected and storing the compressed color image data in a memory;

decompressing the compressed color image data read from the memory to color image data of each pixel and grouping specified adjacent pixels into a second type of block; and judging in block units for each color of the second color system the dot on/off state for each pixel contained in the block based on the decompressed color image data of pixels grouped into the second type of block.

With this first image processing device and first image processing method, it is possible to perform judgment of the dot on/off state quickly by performing this in block units. as the procedure for judging the dot on/off state, it is possible to use known methods such as the error diffusion method, the dither method or the like. The dot on/off state means the presence or absence of dot formation. The image data after color conversion used for judging the dot on/off state in this way is stored once in memory in a compressed state, and when necessary, this presence or absence of dot formation is judged while reading out from the memory. Because of this, the process does not become more complex despite the fact that judgment of the dot on/off state is performed using block units. Also, because mutually adjacent pixels are consolidated a specified plurality at a time as a first type of block, and after detection of the presence or absence of an edge within the block, the image data is compressed according to the presence or absence of the edge, it is possible to perform image data compression and decompression quickly. In this way, with the image processing device and the image processing method noted above, it is possible to perform the process of color converting color image data and converting this to data expressed by the dot on/off state quickly without making the process more complex.

With this kind of first image processing device and image processing method, when judging the dot on/off state for each pixel constituting the second type of block, the judgment may be done as follows. Among the plurality of pixels constituting the second type of block, for the pixels compressed as not including an edge in the first type of block, the color image data of these pixels can be handled as uniform data to judge the dot on/off state. Here, as uniform image data, it is possible to use data for one pixel among this plurality of pixels or to use an average value of the data within the block.

Among the pixels constituting the second type of block, for pixels originally compressed as being included in blocks with no edge, it is thought that the image data takes a close value. Meanwhile, when judging the dot on/off state, if it is possible to handle image data of a plurality of pixels as uniform data, then it is possible to make the process of judging the dot on/off state faster. Therefore, for pixels compressed as not having an edge detected, by handling the data of these pixels as uniform data, it is possible to make the process faster without adversely affecting image quality, making this desirable.

Also, with the image processing device and the image processing method, for each pixel included in the first type of block, it is also possible to detect the presence or absence of an edge based on the post-color conversion color image data, and to compress the post-color conversion color image data and store in the memory according to the presence or absence of an edge within that block.

Since the color image data stored in the memory are image data after color conversion, if the edge is detected based on image data after color conversion and image data is compressed in this way, it is possible to detect edges and compress reliably for each color constituting the second color system, making this desirable.

Alternatively, it is also possible to detect the presence or absence of an edge based on the pre-color conversion color image data for each pixel included in the first type of block, and to compress image data before color conversion for the blocks for which an edge is not detected. In this way, the color image data after compression is color converted, and the obtained image data is stored in the memory.

By doing this, it is possible to consolidate the pixels contained in this block for the blocks for which an edge is not detected and then to do color conversion, making it possible to do color conversion that much more quickly, and thus to be able to quickly perform image processing.

Furthermore, it is also possible to again detect the presence or absence of an edge for each color based on the post-color conversion color image data for the first type of block for which an edge was detected based on the pre-color conversion color image data. Then, according to the results of this edge detection, after the post-color conversion color image data is compressed, the compressed image data is stored in the memory.

By doing this, it is possible to do compression based on image data after color conversion for color image data not compressed before color conversion as well, making it possible to improve the image data compression efficiency. As a result, it is possible to quickly read and write to the memory the post-color conversion color image data, and thus to accelerate the image processing, which is desirable.

With the first image processing device and image processing method described above, when an edge is not detected within the first type of block, it is also possible to compress the image data of a plurality of pixels included within that block to one pixel of image data and store it. Also, when doing this compression, it is also possible to select one pixel from among the plurality of pixels, and to compress to image data of the selected pixel, or to calculate the average value of the image data for the plurality of pixels, and to compress the image data of the plurality of pixels to the obtained average value.

With this kind of method, it is possible to compress the image data of a plurality of pixels quickly and efficiently, and it is also possible to quickly decompress the compressed image data, so this is desirable.

Alternatively, with the first image processing device and the image processing method described above, when the existence of an edge within the first type of block is detected, it is also possible to have the block divided into a sub-block that does not contain an edge, and after compressing the post-color conversion image data for the pixels contained in that sub-block, to store the compressed image data in the memory.

When an edge is detected within the first type of block in this way, if the color image data is compressed in sub-block units, it is possible to further improve the image data compression rate, and thus to accelerate the image process, which is desirable.

Furthermore, with these various types of image processing devices and image processing methods, it is also possible to store the post-color conversion color image data in the memory in a compressed state, and also to store compressed information for expressing that the image data is in a compressed state in the memory as well.

If the compression information is stored together with the compressed image data in this way, it is possible to decompress the image data easily, so this is desirable.

Also, with the first image processing device and image processing method described above, it is also possible to have the first type of block used when compressing the image data and the second type of block used when judging the dot on/off state be the same block.

If the first type of block and the second type of block are made to be the same block, it is possible to use a simple process for reading the compressed color image data from the memory and decompressing it. Because of this, this is optimal because it is possible to perform image processing quickly.

In particular, it is also possible to constitute both the first type of block and the second type of block from four pixels arrayed in two rows and two columns.

When there are too many pixels contained in these blocks, there is a higher probability of containing an edge, making the image process complex. Even so, if there are too few pixels contained in a block, even if the color image data is compressed within a block, the data volume doesn't become that small, and there is little of the merit by performing the judgment of the dot on/off state using block units, so it is difficult to make the image processing sufficiently faster. From this perspective, if the four pixels aligned in two rows and two columns are consolidated into the first type block and the second type block, it is possible to effectively improve the processing speed without making the image process more complex.

To address at least part of the problems described above, the second image processing device of the present invention uses the following constitution. Specifically, it is:

an image processing device for converting color image data expressed by a first color system to image data expressed by a second color system representing each pixel data as a dot on/off state for each color, the image processing device comprising:

a color conversion unit that converts color image data expressed by the first color system to color image data expressed by the second color system;

an edge detection unit that detects an edge existed in a first type of block into which specified adjacent pixels are grouped;

a compressed data storage unit that compresses the color image data of pixels contained in the first type of block for which no edge is detected and stores the compressed color image data in a memory;

a data decompression unit that decompresses the compressed color image data read from the memory to color image data; and a dot formation judgment unit that judges for each color of the second color system the dot on/off state based on the decompressed color image data.

Also, the second image processing method of the present invention corresponding to the image processing device noted above is:

an image processing method for converting color image data expressed by a first color system to image data expressed by a second color system representing each pixel data as a dot on/off state for each color, the image processing method comprising:

converting color image data expressed by the first color system to color image data expressed by the second color system;

detecting an edge existed in a first type of block into which specified adjacent pixels are grouped;

compressing the color image data of pixels contained in the first type of block for which no edge is detected and storing the compressed color image data in a memory;

decompressing the compressed color image data read from the memory to color image data; and judging for each color of the second color system the dot on/off state based on the decompressed color image data.

With this kind of second image processing device and image processing method as well, post-color conversion image data is stored once in memory in a compressed state. Then, when judging the dot on/off state, judging is done while reading and decompressing data from the memory as necessary. By doing this, it is possible to rapidly perform the process of color converting color image data and converting this to data expressed by the dot on/off state without making the process more complex.

Furthermore, the present invention may also be realized using a computer by reading into a computer a program for realizing the image process described above. Therefore, the present invention may also be understood as a program or recording medium corresponding to the first and second image processing method described above.

If this kind of program or a recording medium on which the program is recorded is read into a computer and the various types of functions described above are realized using the computer, it is possible to convert color image data rapidly without making the image processing more complex.

PREFERRED EMBODIMENTS OF THE INVENTION

To more clearly describe the operation and effect of the present invention, embodiments of the present invention are described below in the following order.
A. Embodiments:
B. First Embodiment:
  B-1. Device Constitution:
  B-2. Summary of Image Processing:
  B-3. Color Conversion and Compression Process of the First Embodiment:
  B-4. Summary of Halftone Processing:
C. Second Embodiment:
D. Third Embodiment:
E. Variation Examples:

A. Embodiments

Figure 1:
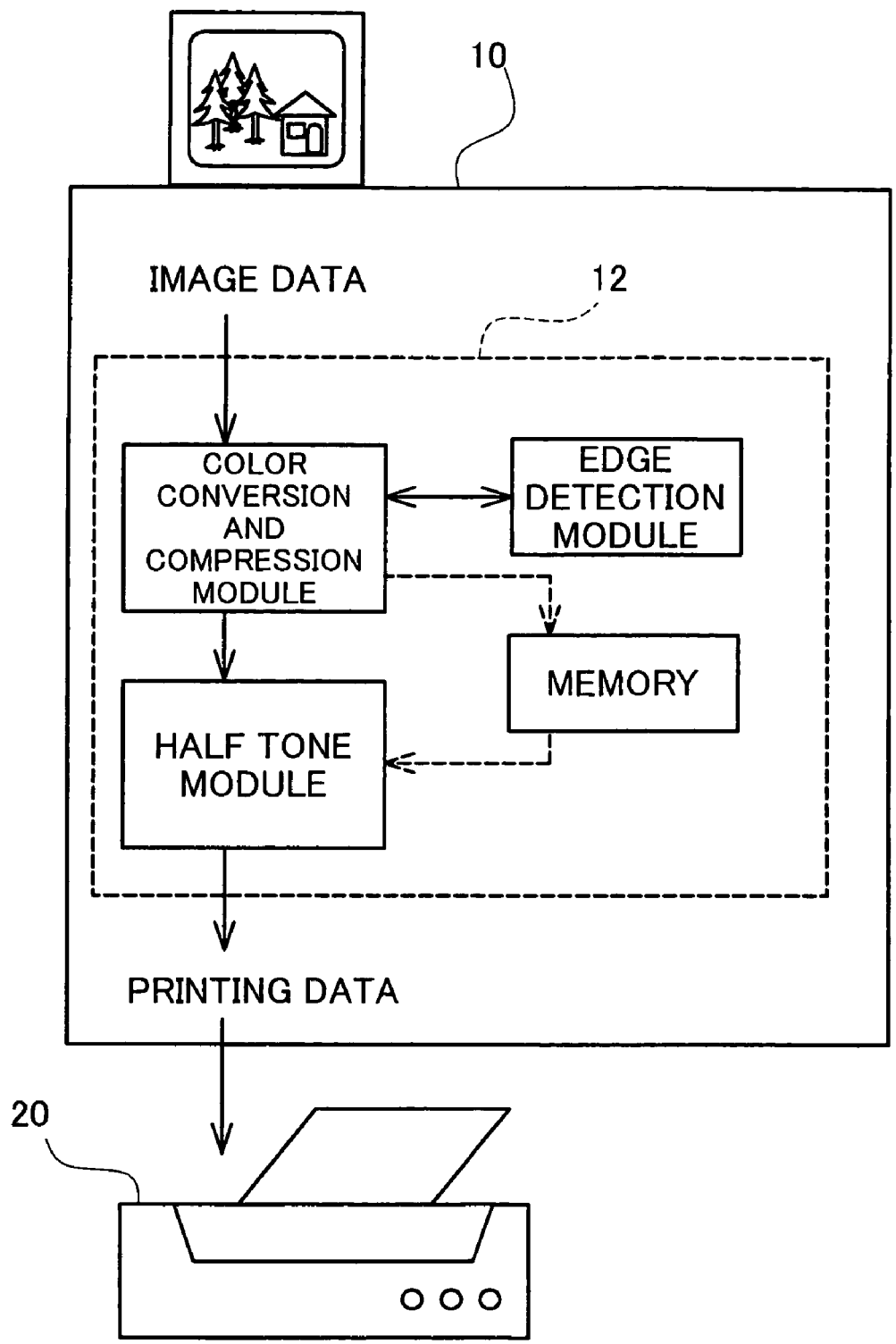
FIG. 1 is a schematic block diagram of the printing system showing an example of the gist of the present invention.

Before starting the detailed description of the embodiments, for ease of understanding, a simple description will be given of aspects of embodying the invention. FIG. 1 is an explanatory drawing showing an example of the schematic constitution of an aspect of embodying the invention using a printing system as an example. This printing system is constituted from an image processing device 10, a color printer 20, and the like. The image processing device 10 is a computer on which is executed software for image processing prepared in advance, and when gradation image data of an RGB color image is received from imaging equipment such as a digital camera, a color scanner, or the like, by performing a specified image process on the color image data, this is converted to printing data expressed by the dot on/off state of each color that can be printed by the color printer 20. This image process is performed using an exclusive program called a printer driver 12. Moreover, the RGB color image data may be created by the image processing device 10 itself using various types of application programs.

The printer driver 12 shown as an example in FIG. 1 comprises a plurality of modules such as a color conversion and compression module, an edge detection module, a halftone module, and the like. The color conversion and compression module receives RGB image data for which the resolution has been converted, and color converts this to colors of dots that can be formed by the color printer 20, specifically, to CMY image data expressed by each color of cyan (C), magenta (M), yellow (Y), or each color with black (K) added to these. Prior to color conversion, it is also possible to perform pre-processing as necessary such as converting the resolution for the color printer 20 to print the resolution of the image data, or the like. For the post-color conversion image data, after adjacent pixels are consolidated a specified plurality at a time as blocks and compressed, this data is stored in memory. Alternatively, as described hereafter, it is also possible to compress before color conversion, and to do color conversion in a compressed state. When doing image data compression, a detection is done of whether or not there is an edge within the block, and compression is done according to this detection result. The edge detection is performed by the edge detection module. Details of the compression according to the edge detection results are described with each embodiment described hereafter.

The halftone module reads the compressed, stored image data from the memory, and after consolidating adjacent pixels a plurality at a time as blocks, judgment of the dot on/off state for each pixel included in a block is performed in block units. Here, the blocks generated by the halftone module do not have to be the same as the blocks generated by the color conversion and compression module, and may also, for example, have different pixel counts for the blocks generated by the halftone module and the blocks generated by the color conversion and compression module. Also, for the method of performing judgment of the dot on/off state in block units as well, it is possible to use various methods including the method described hereafter. In this way, after adding halftone processing to the image data of each color generated by color conversion, the obtained data is output to the color printer 20 as printer data. Prior to output to the color printer 20, it is also possible to perform post-processing as necessary such as realigning the data sequence considering the sequence in which the printer formed the dots, or the like. The color printer 20 prints color images by forming ink dots of various colors on the printing medium based on the printing data obtained in this way.

The image processing device described above compresses the post-color conversion image data and stores it once in memory, and reads and decompresses the image data from the memory as necessary, and then performs halftone processing. The halftone processing is performed a plurality of pixels at a time in block units, making rapid processing possible. Also, with the halftone processing, the image data is read from the memory and processed as necessary, so it is possible to significantly simplify the halftone processing despite performing the processing in block units. Of course, there will be new occurrence of the process of compressing and decompressing the image data, or the process of reading and writing the image data to the memory, but as described hereafter, if compression is done according to the presence or absence of an edge within the block, it is possible to do compression and decompression of image data very rapidly. Also, by handling compressed image data in this way, it is possible to perform reading and writing to memory very rapidly. Because of this, with the image processing of the present invention, it is possible to improve the processing speed for the overall image process while simplifying the processing contents. Hereafter, details of this kind of image processing is described based on embodiments.

B. First Embodiment

Figure 2:
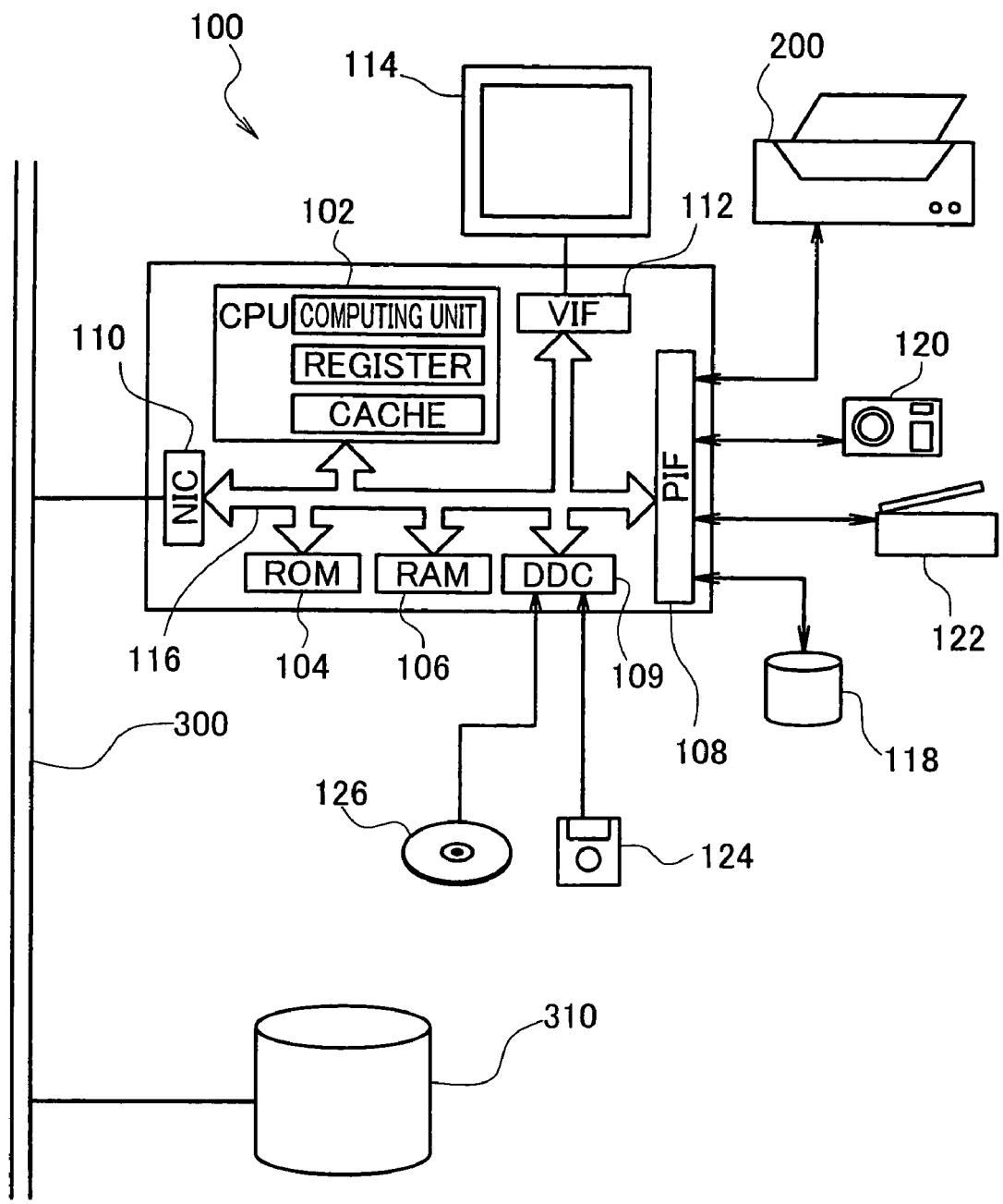
FIG. 2 is an explanatory drawing showing the constitution of a computer as the image processing device of this embodiment.

B-1. Device Constitution:

FIG. 2 is an explanatory drawing showing the constitution of the computer 100 as the image processing device of this embodiment. The computer 100 is a known computer constituted by a CPU 102 at the center, a ROM 104, a RAM 106 used as the memory described above, and the like, with these mutually connected by a bus 116. Incorporated in the CPU 102 are a calculator, register, cache, or the like. The register or cache are one type of the same memory as the RAM 106 in terms of storing data, but compared to the RAM 106, it can read and write data at a much higher speed.

Connected to the computer 100 are a disk controller DDC 109 for reading the data of a flexible disk 124 or a compact disk 126, a peripheral device interface for performing sending and receiving of data with peripheral devices (hereafter called PIF) 108, a video interface for driving the CRT 114 (hereafter called VIF) 112, or the like. Connected to the PIF 108 are the color printer 200 to be described later, the hard disk 118, or the like. Also, if the digital camera 120, the color scanner 122 or the like are connected to the PIF 108, it is possible to print images taken using the digital camera 120 or the color scanner 122. Also, if a network interface card NIC 110 is mounted, it is possible to connect the computer 100 to a communication line 300 and to fetch data stored in the storage device 310 that is connected to the communication line.

Figure 3:
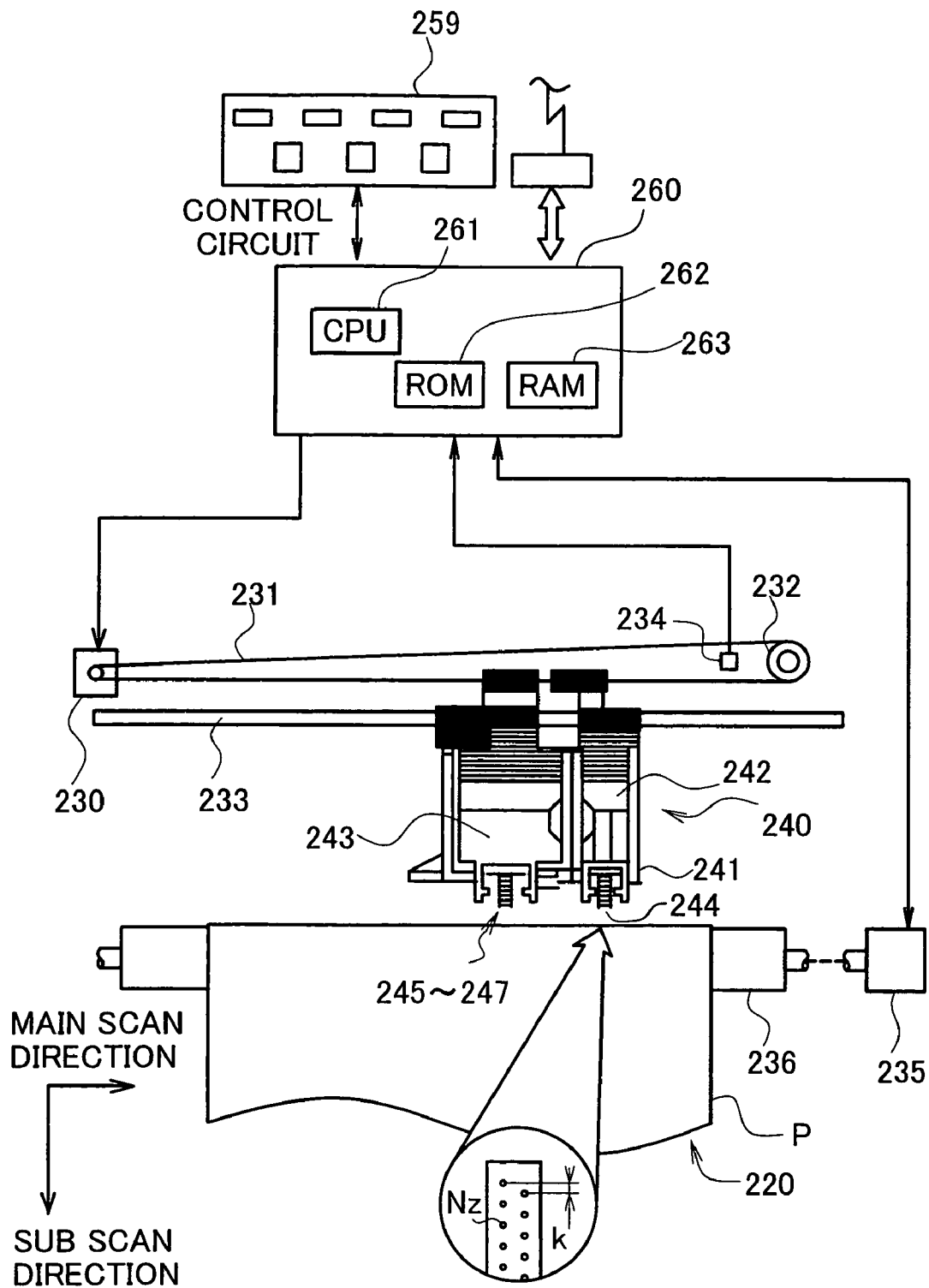
FIG. 3 is a schematic block diagram of a printer as the image display device of this embodiment.

FIG. 3 is an explanatory drawing showing the schematic structure of the color printer 200 of the first embodiment. The color printer 200 is an inkjet printer capable of forming dots of four colors of ink of cyan, magenta, yellow, and black. Of course, it is also possible to use an inkjet printer capable for forming a total of six colors of ink dots including in addition to these four colors a cyan ink with a pigment density approximately ¼ lower than cyan ink (light cyan) and a magenta ink similarly with a lower pigment density (light magenta).

As shown in the figure, the color printer 200 comprises a mechanism for performing ink blowing and dot formation by driving the printing head 241 placed in a carriage 240, a mechanism for moving this carriage 240 back and forth in the axial direction of a platen 236 (hereafter called the main scan direction) by a carriage motor 230, a mechanism for transporting the printing paper P in a direction orthogonal to the main scan direction (hereafter called the sub scan direction) by a paper feed motor 235, and a control circuit 260 for controlling the dot formation, the movement of the carriage 240, and the transport of the printing paper.

Mounted in the carriage 240 are an ink cartridge 242 for holding black ink, and an ink cartridge 243 for holding each type of ink including cyan ink, magenta ink, and yellow ink. When the ink cartridges 242 and 243 are mounted in the carriage 240, each ink within the cartridge passes through an introduction tube that is not illustrated, and is supplied to ink blowing heads for each color 244 to 247 provided on the bottom surface of the printing head 241. One set each of 48 nozzles Nz of nozzle arrays arrayed at a fixed nozzle pitch k is provided in the sub scan direction on the ink blowing heads for each color 244 to 247.

The control circuit 260 comprises the CPU 261, the ROM 262, the RAM 263, and the like. The control circuit 260 suitably drives the carriage motor 230 and the paper feed motor 235. By doing this, the main scan and the sub scan of the carriage 240 are controlled. Also, the control circuit 260 performs control of blowing of the ink drops at a suitable timing from each nozzle based on the printing data supplied from the computer 100. In this way, under the control of the control circuit 260, by forming dots of each color ink at suitable positions on the printing medium, the color printer 200 is able to print color images.

Moreover, it is possible to use various methods for the method of blowing ink drops from each color ink blowing head. Specifically, it is possible to use a method of blowing ink using piezo electric components, a method of blowing ink drops by generating bubbles within the ink bath using a heater placed in the ink path, or the like. Also, instead of blowing ink, it is also possible to use a printer of a method of forming ink dots on printing paper using a phenomenon such as thermal transfer or the like, or a method of adhering toner powder of each color onto a printing medium using static electricity.

Furthermore, it is also possible to use a so called variable dot printer which is able to control the size of the ink dots formed on the printing paper by controlling the size of the blown ink dots, or by blowing a plurality of ink dots at one time and controlling the number of ink drops blown.

The color printer 200 having a hardware constitution like that described above moves each color ink blowing head 244 to 247 in the main scan direction in relation to the printing paper P by driving the carriage motor 230, and by driving the paper feed motor 235, moves the printing paper P in the sub scan direction. The control circuit 260 drives the nozzles at suitable timing while repeating the main scan and the sub scan of the carriage 240 according to the printing data, and thus the color printer 200 prints the color image on the printing paper.

Figure 4:
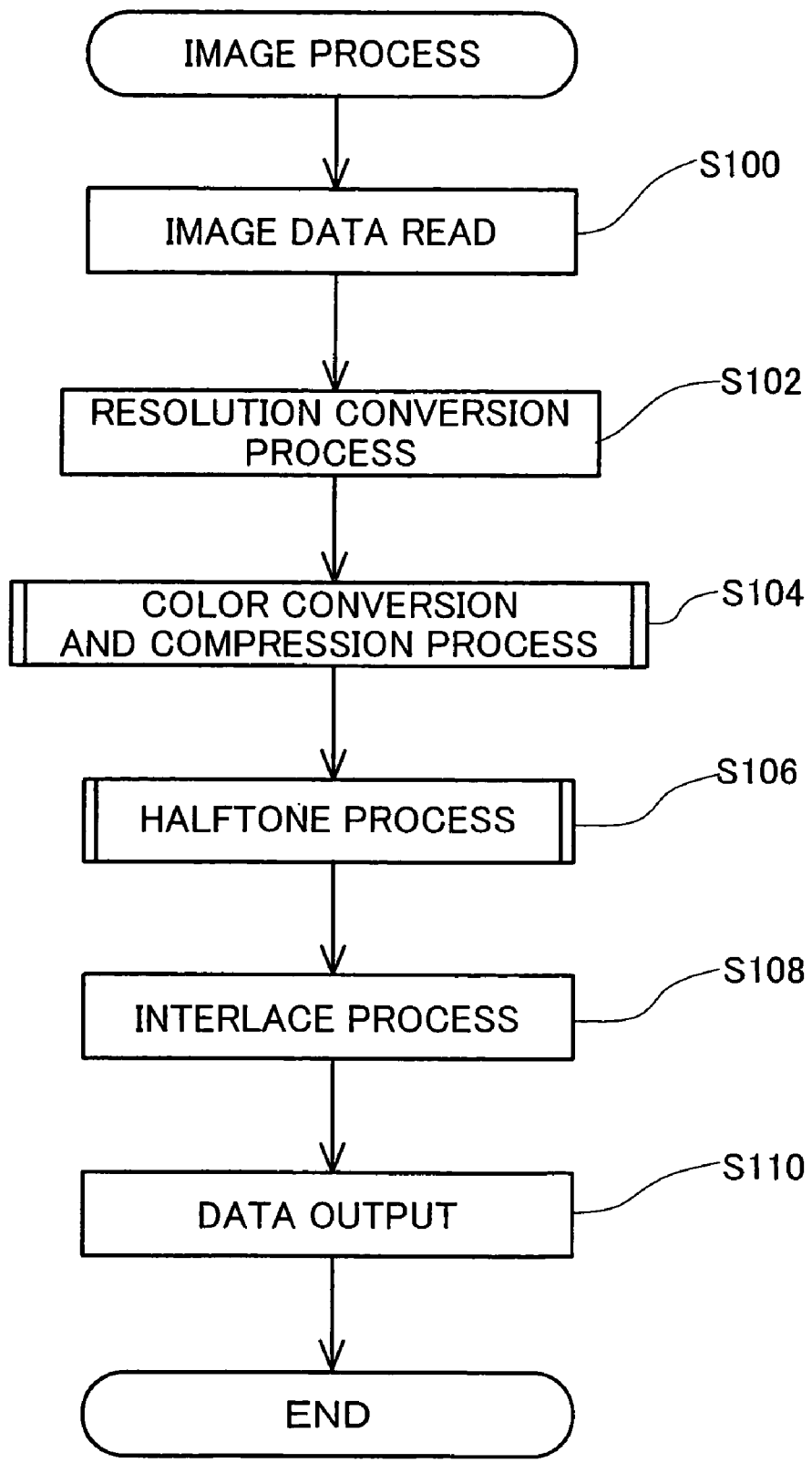
FIG. 4 is a flow chart showing the flow of the image process performed with the image processing device of this embodiment.

B-2. Summary of Image Processing:

FIG. 4 is a flow chart showing the flow of the process of the computer 100 as the image processing device of this embodiment converting image data to printing data by applying a specified image process to the received image data. This image process starts by the operating system of the computer 100 activating the printer driver 12. Following, a simple description of the image process of this embodiment is given according to FIG. 4.

When the image process starts, the printer driver 12 first starts reading RGB color image data to be converted (step S100). Next, the resolution of the fetched image data is converted to the resolution for printing by the color printer 200 (step S102). When the resolution of the color image data is lower than the printing resolution, new data is generated between adjacent image data by performing linear interpolation, and conversely when it is higher than the printing resolution, the image data resolution is converted to the printing resolution by culling the data at a fixed percentage.

When the resolution is converted in this way, color conversion and compression of the color image data is performed, and the image data after compression undergoes the process of writing to memory, specifically, the RAM 106 (step S104). With the color conversion, the color image data expressed by combinations of the RGB gradation values undergo the process of conversion to image data expressed by combinations of the gradation values of each color used by the color printer 30 such as C, M, Y, K, and the like. Details of the color conversion and compression process are described hereafter.

The printer driver 12 starts the halftone process after the color conversion and compression process (step S106). The halftone process is the following kind of process. The RGB image data is converted to each color C, M, Y, and K gradation data by performing color conversion. Each of these color gradation data are data having 256 gradations from gradation value 0 to 255. In comparison to this, the color printer 200 of this embodiment is only able to use either of the status "form dots" or "do not form dots." In light of this, it is necessary to convert each color gradation data having 256 gradations to image data expressed by the 2 gradations that can be expressed by the color printer 200. The process that performs this kind of gradation count conversion is the halftone process. As described hereafter, the printer driver 12 of this embodiment reads the image data already compressed and color converted from the memory, specifically the RAM 106, and after consolidating the adjacent pixels a specified plurality at a time in blocks, it performs halftone processing in block units. By processing in block units in this way, it is possible to perform halftone processing quickly. The halftone process performed in block units is described in detail hereafter.

When this kind of halftone processing ends, the printer driver starts the interlace process (step S108). The interlace process is a process of realigning the image data converted to a format for expressing the dot on/off state in the sequence to be transferred to the color printer 200 while considering the dot formation sequence. The printer driver 12 outputs the finally obtained image data after interlace processing to the color printer 200 as printing data (step S110). The color printer 200 forms each color ink dot on the printing medium according to the printing data. As a result, the color image corresponding to the image data is printed on the printing medium.

With the image process described above, the color converted image data is stored once in memory, and when doing the halftone processing, the necessary image data is read from the memory and processed. Because of this, the halftone process is not made more complex despite the fact that the process is performed in block units to make it faster. The image data is read and written to the memory in a compressed state, so it is possible to quickly execute the operation of writing color converted image data and the operation of reading from memory for halftone processing. It is reasonable that when reading and writing image data in a compressed state in this way, the process of compressing and decompressing data is required, but as described hereafter, the adjacent pixels are consolidated as blocks a specified plurality of pixels at a time, and image data is compressed according to the presence or absence of an edge within a block, so it is possible to perform image data compression and decompression very quickly. Because of this, with the image process of this embodiment, rapid processing is possible without making the processing contents more complex.

Figure 5:
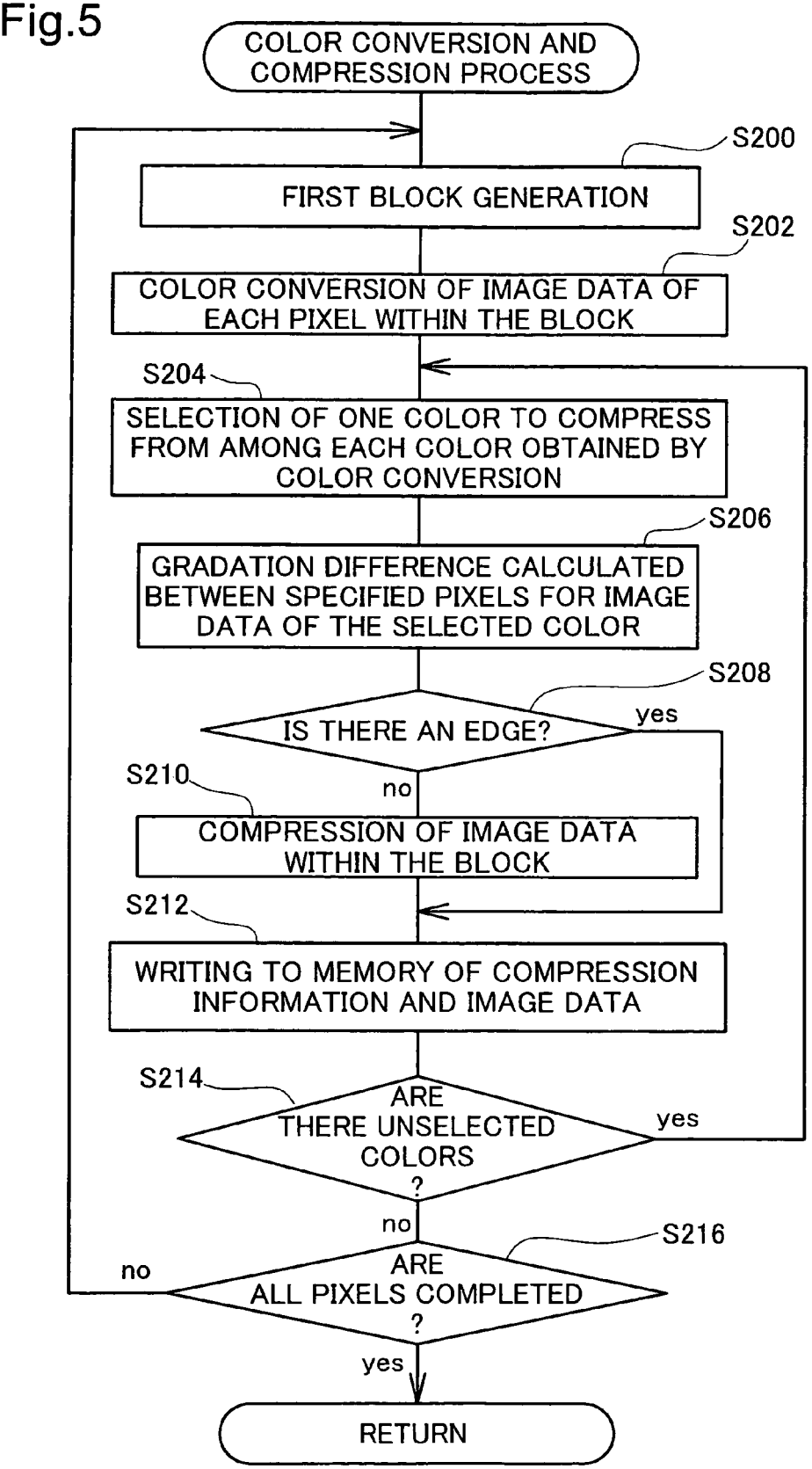
FIG. 5 is a flow chart showing the flow of the color conversion and compression process of the first embodiment.

B-3. Color Conversion and Compression Process of the First Embodiment:

FIG. 5 is a flow chart showing the flow of the color conversion and compression process of the first embodiment. This process is a process executed using the functions of the CPU 102 built into the computer 100. Following is a description following the flow chart.

Figure 6A:
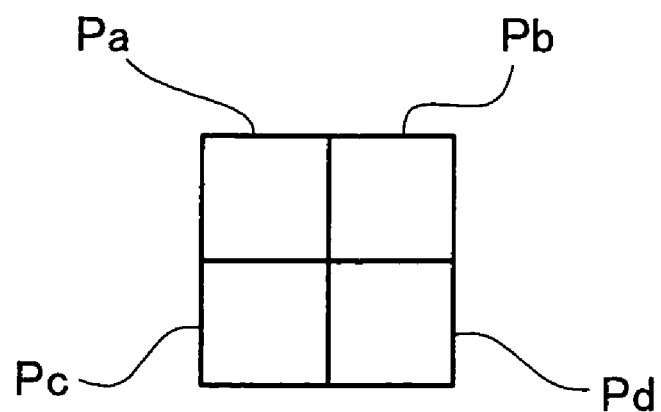
FIG. 6A and FIG. 6B are explanatory drawings showing the situation of consolidating a plurality of pixels and setting a first block.
Figure 6B:

When the color conversion and compression process of the first embodiment starts, first, adjacent pixels are consolidated a specified plurality at a time to generate a first block (step S200). FIG. 6A and FIG. 6B are explanatory drawings conceptually showing examples of the situation of consolidating the plurality of pixels and forming the first block. FIG. 6A shows the situation of generating the first block by consolidating the four pixels Pa, Pb, Pc, and Pd two vertical and horizontal rows at a time. Also, FIG. 6B shows the situation of consolidating as the first block the two horizontally aligned pixel Pa and pixel Pb. Of course, the method for generating the first block is not limited to this example, and it is also possible to use a first block that consolidates a plurality of pixels that are in a specified positional relationship to each other. Moreover, for convenience of the description, following, the first block is described in a case of being constituted by four pixels as shown in FIG. 6A.

Once the first bock is generated, for each pixel within that block, a process of color converting the image data is performed (step S202). Now, since the first block is constituted by four pixels as shown in FIG. 6A, the respective RGB image data of these four pixels are converted to gradation data of each color C, M, Y, and K. This kind of conversion may be performed quickly by referencing a three-dimensional number chart called a color conversion table (Look-Up-Table, hereafter called LUT).

Figure 7:
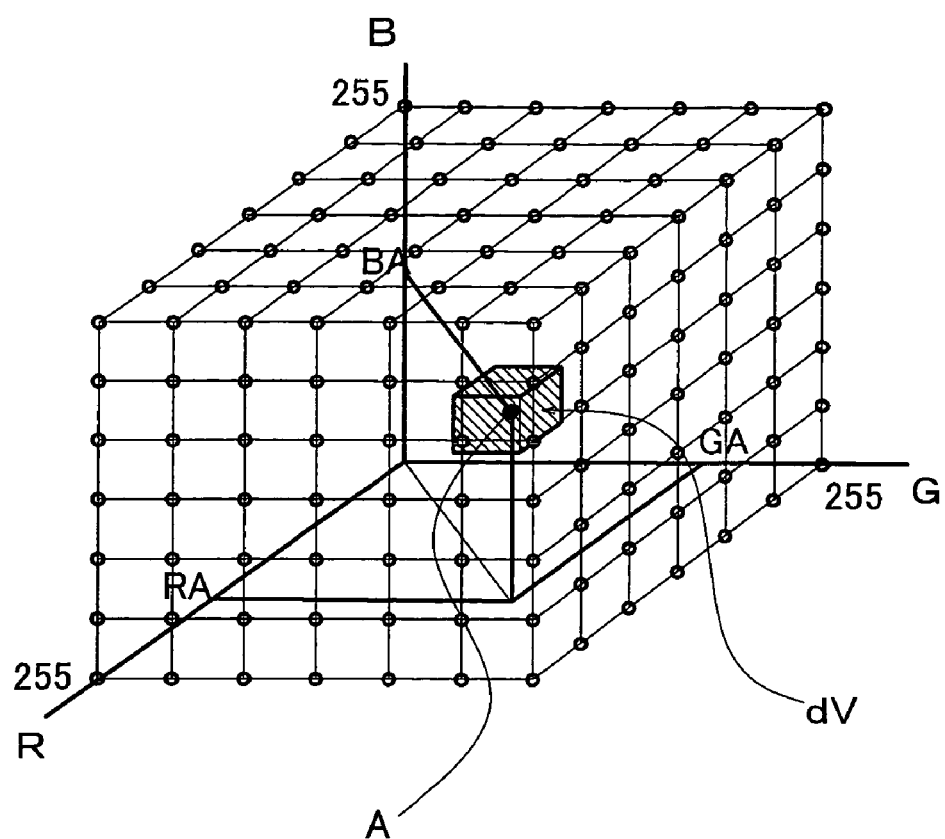
FIG. 7 is an explanatory drawing that conceptually shows the color conversion table referenced for color conversion.

FIG. 7 is an explanatory drawing that conceptually shows the LUT. If the image data is 1 byte of data, it is possible to use values from 0 to 255 for the gradation values of each color RGB, so the RGB image data may be expressed as coordinates within a cube of side length 255 using the R axis, G axis, and B axis as the three orthogonal axes as shown in FIG. 7. This kind of cube is called a color solid. The LUT divides the color solid into grid form, and is a number chart on which is stored the gradation values of each color CMYK at each grid point. At step S202 of FIG. 5, by referencing this kind of LUT, the RGB image data of each pixel constituting the first block is color concerted to CMYK data rapidly.

Next, one color to be compressed is selected from among each color C, M, Y, and K generated by color conversion (step S204). Next, the process of calculating the gradation difference between specified pixels within the first block is performed for the gradation value of the selected color (step S206). By obtaining the gradation difference in this way, it is possible to easily judge the presence or absence of an edge within the block. This is described while referring to FIG. 8A and FIG. 8B.

Figure 8A:
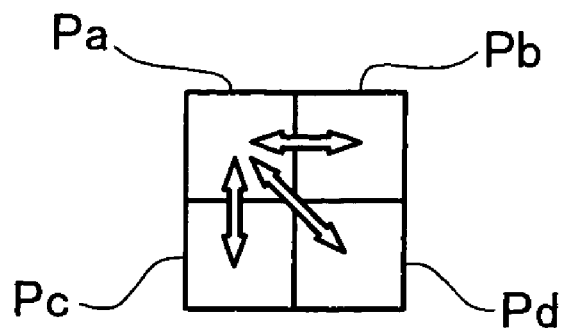
FIG. 8A and FIG. 8B are explanatory drawings that conceptually show the situation of detecting the presence or absence of an edge by calculating the gradation difference between specified pixels within a block.

FIG. 8 is an explanatory drawing that conceptually shows the situation of calculating the gradation difference between specified pixels within a block. For example, at step S04 in FIG. 5, when the color C is selected as the color to be compressed, as shown in FIG. 8A, the gradation value for color C is calculated between the pixel Pa at the upper left in the block and the pixel Pb at the upper right. Similarly, the gradation difference between the upper left pixel Pa and lower left pixel Pc, and the gradation difference for the color C between the pixel Pa and the lower right pixel Pd are calculated. The gradation difference between the pixel Pa and the pixel Pb indicates the volume of change in gradation value in the main scan direction (left right direction at the top of FIG. 8A). Similarly, the gradation difference between the pixel Pa and the pixel Pc indicates the volume of change in the gradation values in the sub scan direction (up down direction at the top of FIG. 8A), and the gradation difference between the pixel Pa and the pixel Pd indicates the volume of change in the diagonal direction. Since we can think of the gradation difference being bigger at the edge parts, if the gradation difference obtained in this way is below a specified threshold value for any direction vertical, horizontal, or diagonal, it is possible to judge that there is no edge within the block for the color C. In contrast to this, when the gradation difference is greater than the specified threshold value for any of the directions, it is possible to judge that there is an edge within the block for the color C.

Figure 8B:
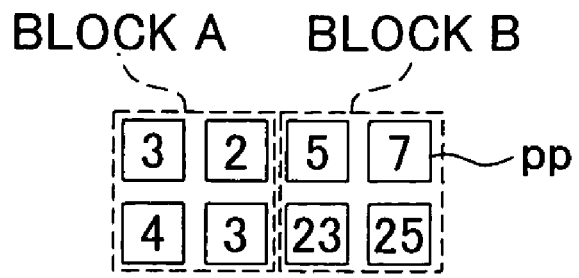

The situation of detecting an edge is described using the specific example shown in FIG. 8. In FIG. 8B, the eight small squares pp indicated aligned in two rows and four columns respectively indicate pixels, and the numerical values displayed in the squares pp indicate the gradation value of each pixel for the color selected to be compressed (here, this is color C). First, focusing on block A in FIG. 8B, the gradation difference in the main scan direction and the sub scan direction are both gradation value "1," and the diagonal direction gradation difference is "0." In all of the directions, the gradation difference is small, and therefore in this kind of case, it is possible to judge that an edge is not contained in the block A. Next, focusing on the block B, the gradation difference of the main scan direction is gradation value "2," but the gradation difference of the sub scan direction is gradation value "18," and the gradation difference of the diagonal direction is gradation value "20" which are relatively large values. Therefore, if the threshold value is set at about gradation value "15," for example, it is possible to detect an edge within the block B. In this way, by detecting the gradation difference between specified pixels within a block, it is possible to easily detect the presence or absence of an edge. In light of this, at step S204 of FIG. 5, the respective gradations differences in the vertical, horizontal, and diagonal directions within the block are calculated as shown in FIG. 8A.

The presence ore absence of an edge within the block is judged based on gradation differences calculated in this way. Specifically, the calculated gradation difference and the specified threshold value are compared, and if there is even one gradation difference bigger than the threshold value, it is judged that there is an edge within that block (step S208: yes). Conversely, when all of the gradation differences are smaller than the threshold value, it is judged that there is not an edge within that block (step S208: no).

Figure 9A:
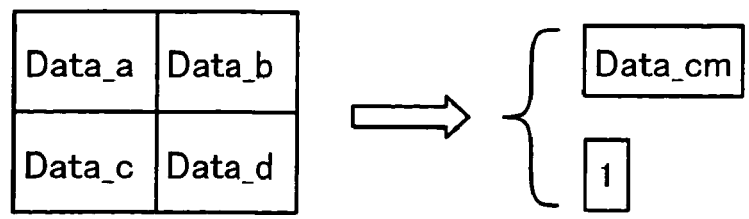
FIG. 9A and FIG. 9B are explanatory drawings that conceptually show the situation of compressing image data within a block according to the presence or absence of an edge and storing this in memory.
Figure 9B:
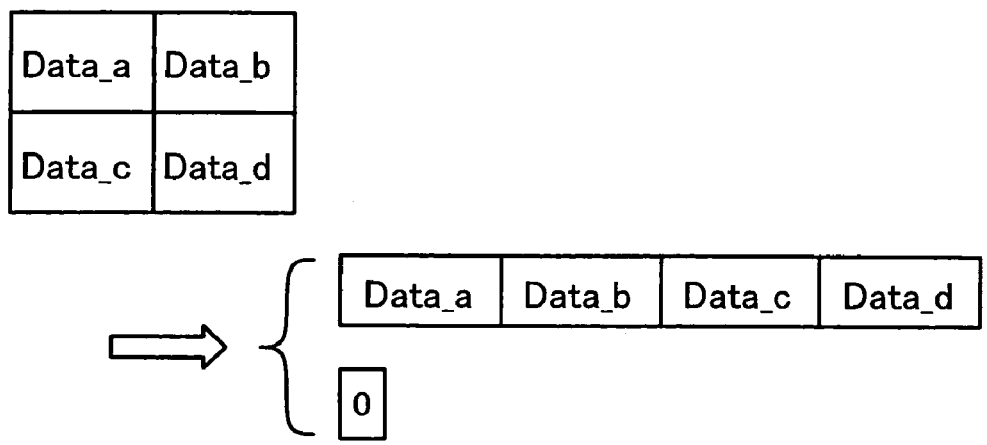

Next, the image data within the block is compressed according to the presence or absence of an edge (step S210), and the process of writing the obtained image data to the memory is performed (step S212). FIG. 9 is an explanatory drawing that conceptually shows this situation. FIG. 9A shows the process when there is no edge within the block, and FIG. 9B shows the process when there is an edge within the block. In the drawings, each of the four small squares aligned in two rows vertically and horizontally indicates a pixel contained in the block. Also, the Data_a, Data_b, Data_c, and Data_d displayed within each square represent the gradation values of each pixel for the color to be compressed (here this is color C).

When there is no edge within the block, the gradation difference between each pixel is small, and therefore for the color C, the gradation value of any pixel is about the same value. In light of this, in this kind of case, the average value Data_cm of the gradation values within the block is calculated, and the four pixel gradation values Data_a, Data_b, Data_c, and Data_d are compressed to the gradation value Data_cm. Then, written to the memory are the gradation value Data_cm and the value "1" expressing the fact that the gradation value Data_cm compressed four pixels of gradation values. In this way, the value for expressing how many pixels of gradation values the gradation values stored in the memory correlates to are called the compression information. FIG. 9A conceptually expresses the situation of the four gradation values contained within the block being compressed to one gradation value Data_cm and this being written to the memory together with the compression information "1."

In contrast to this, when there is an edge within the block, the gradation values Data_a, Data_b, Data_c, and Data_d of each pixel are not compressed, and are written as is in sequence to the memory together with the compression information "0." The compression information "0" indicates that the gradation values within the block are not compressed, and therefore, that the four gradation values Data_a, Data_b, Data_c, and Data_d correlate to the gradation values of the four pixels Pa, Pb, Pc, and Pd within the block. FIG. 9B conceptually expresses the situation of the four gradation values contained within the block being written as is to the memory together with the compression information.

After the gradation values of each pixel contained within the block are compressed according to the presence or absence of an edge at step S212 shown in FIG. 5, the process of writing this to memory together with the compression information is performed. By doing this, the data volume increases by the amount that compression information is added for the blocks containing an edge, but for blocks not containing an edge, it is possible to express the four pixels of gradation values using one gradation value, so it is possible to compress the image data as a whole. Also, the memory capacity required for storing the compression information is very small compared to the gradation value of each pixel. For example, with the examples shown in FIG. 9A and FIG. 9B, the compression information can only use either the value "0" or "1," and therefore 1 bit of storage capacity per block is sufficient. The increase in the data volume by adding the compression information in this way is only a slight amount, and it is possible to significantly compress the image data as a whole.

Moreover, for writing the compression information and gradation values to the memory, with this embodiment, an area for storing the compression information and an area for storing the gradation values are secured on the memory, and the compression information and the gradation values are written to those respective areas. Of course, the aspect of the invention is not limited to this kind of method, and it is also possible to write the gradation value after the compression information, and to write these to the same area on the memory, for example.

If the gradation values of each pixel for the color selected to be compressed (here this is color C) and the gradation values are written to the memory as described above, a judgment is made of whether or not unselected colors remain (step S214). Here, only the color C has been selected at this point, so the judgment is yes at step S214. Then, returning to step S204, a new color is selected, and the series of processes described above is performed. The processing like that described above is repeated, and once the selection of all the colors has ended (step S214: no), the color conversion and compression processing for one block is performed.

Once the processing for one block has ended in this way, a judgment is made of whether or not any unprocessed pixels remain (step S216). Then, if unprocessed pixels remain (step S216: no), the process returns to step S200 to generate a new block, and the series of processes continues to be performed for each pixel within this block. When the processing for all the pixels is completed in this way (step S216: yes), the color conversion and compression procession shown in FIG. 5 is completed, and the process returns to the image processing of FIG. 4. With the image process, after the color conversion and compression processing (step S104 of FIG. 4), the halftone process (step S106 of FIG. 4) is performed. With the halftone process of this embodiment, after reading the compressed image data from the memory, by performing the halftone process in block units, rapid processing is possible. Following, the halftone process of this embodiment is described.

Figure 10:
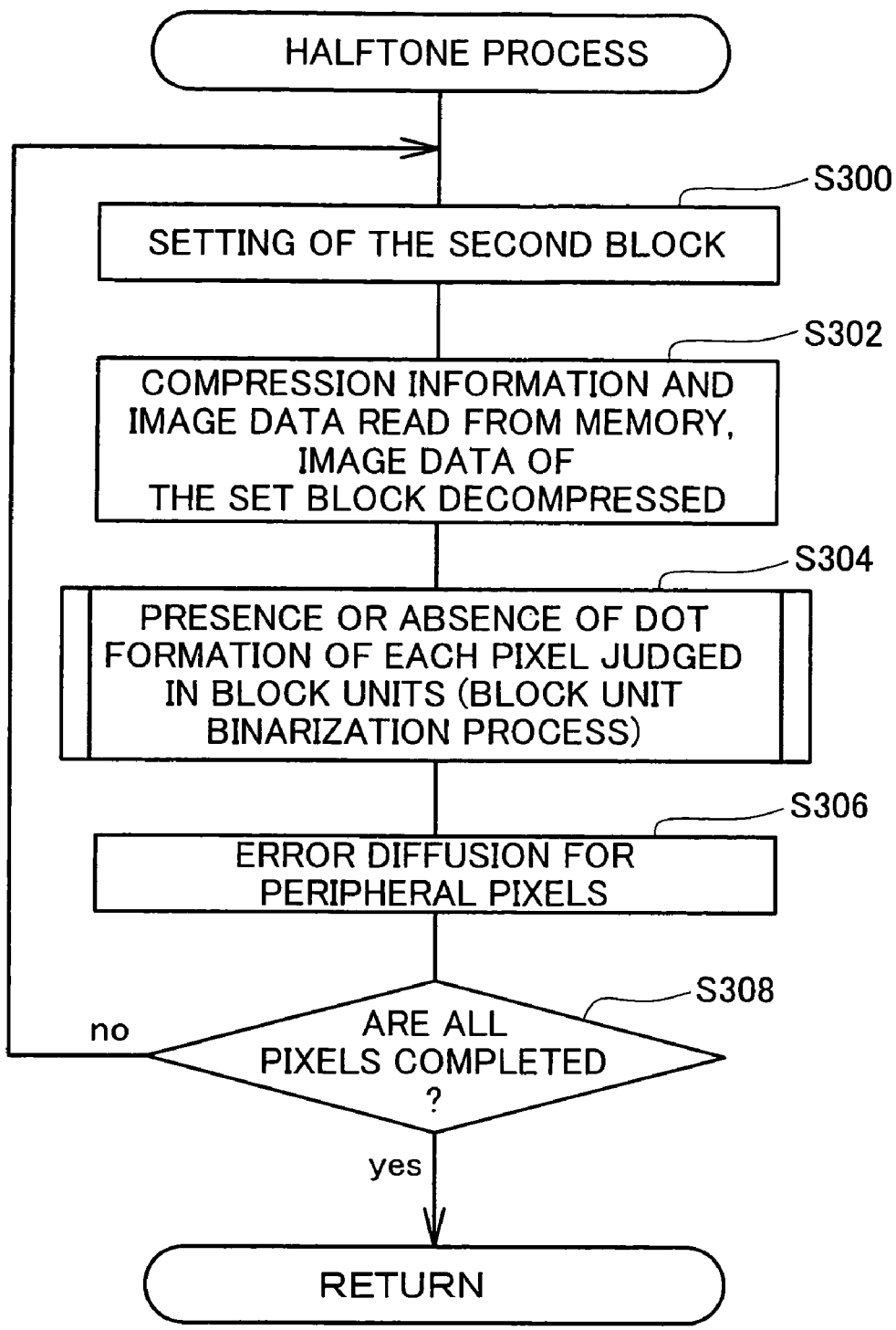
FIG. 10 is a flow chart showing the flow of the halftone process performed in block units.

B-4. Summary of Halftone Processing:

FIG. 10 is a flow chart showing the flow of halftone processing performed in block units for the image processing of this embodiment. This process is also executed using the functions of the CPU 102 built into the computer 100. Moreover, the halftone process is performed for each color C, M, Y, and K obtained by color conversion, but to avoid the description becoming complex, following, the performance of the same process for each color will be expressed by describing without specifying the color.

When processing starts, first, the block for performing halftone processing is set (step S300). This block comprises a plurality of mutually adjacent pixels in a specified positional relationship. Moreover, as described previously using FIG. 5, with the image processing of this embodiment, processing is performed in block units for the color conversion and compression processing as well. The blocks for processing with the color conversion and compression process and the blocks for processing with the halftone process described hereafter do not necessarily have to match. In light of this, with this specification, the blocks set for the color conversion and compression process are called the first blocks, and the blocks set for the halftone process are called the second blocks to distinguish them.

Figure 11A:
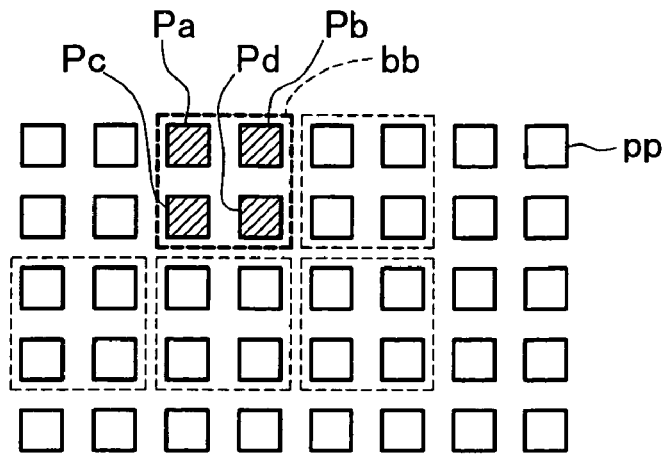
FIG. 11A to FIG. 11E are explanatory drawings showing examples of the second blocks set for the halftone process performed in block units.
Figure 11B:
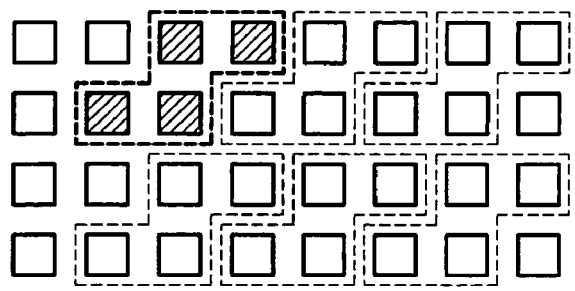
Figure 11C:
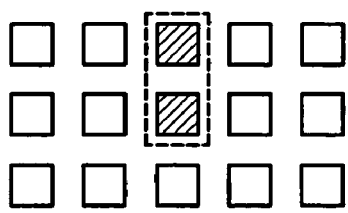
Figure 11D:
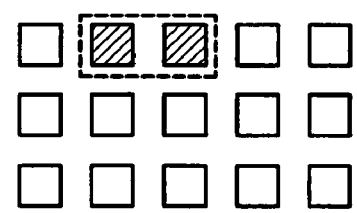
Figure 11E:
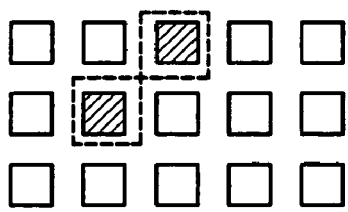

For the halftone process as well, it is possible to use various formats for the second block. FIG. 11A to FIG. 11E are explanatory drawings that show examples of various aspects that can be used for the second blocks. The small squares pb shown in the drawing each represent a pixel, and the plurality of pixels with cross hatching are pixels obtained as the second blocks bb. In the drawing, the second blocks are expressed enclosed by a dotted line. For convenience of the description, hereafter, the description will be made for an example with four pixels with two rows each vertically and horizontally set as the second block as shown in FIG. 11A.

Once the second block for halftone processing is set in this way, the compression information and the image data stored during the color conversion and compression process described above are read from the memory, and the decompression process is performed with this as the second block (step S302). For example, when the compression information value is "1," this indicates that the post-color conversion image data is compressed and stored in the memory (see FIG. 9A). In light of this, the gradation value Data_cm read from the memory is set for the four pixels Pa, pixel Pb, pixel Pc, and pixel Pd within the second block shown in FIG. 11A. By doing this, it is possible to quickly decompress the image data of the second block from the image data that is compressed and stored. The compressed and stored blocks are originally blocks with a small gradation difference between pixels, so even when the same gradation value Data_cm is set for all the pixels in this way, there is no significant degradation of the image quality.

Conversely, when the compressed information value read from the memory is "0," this indicates that the image data is stored in the memory as is without being compressed (see FIG. 9B). In light of this, the four pixels of image data are read from the memory, and these image data are respectively set as the gradation values of the four pixels Pa, pixel Pb, pixel Pc, and pixel Pd within the second block.

As described above, at step S302, it is possible to decompress the image data using an extremely simple method by using the compression information. Because of this, it is possible to read the compressed image data from the memory and to rapidly decompress the image data of the second block.

Moreover, here, the example used has the first block and the second block matching, but as described above, it is not necessary to have these blocks match. When they do not match, the compression information and the image data stored in the memory can be read until the image data setting ends for all the pixels contained in the second block. Therefore, it is possible to have a situation when part of the pixels in the second block are stored in the memory in a compressed state, and the other pixels are stored without being compressed.

Next, for each of the pixels within the second block decompressed in this way, the process of judging the dot on/off state is performed in block units (step S304). The details of this process are described later using a separate drawing.

Figure 12:
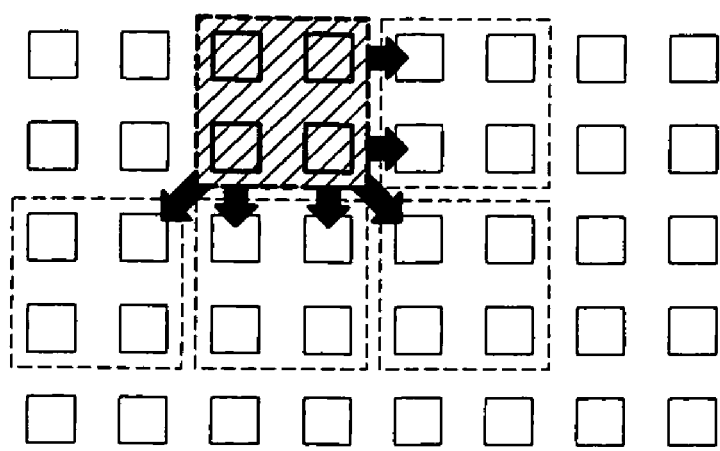
FIG. 12 is an explanatory drawing that conceptually shows the situation of diffusing to peripheral pixels the errors that occur with the block processes with the halftone process.
Figure 13A:
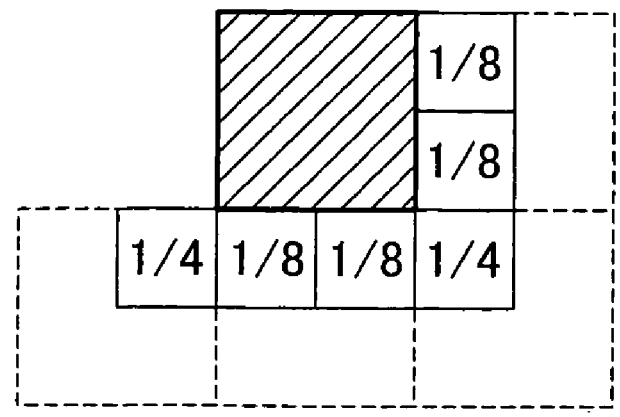
FIG. 13A and FIG. 13B are explanatory drawings showing examples of the diffusion rate when diffusing to peripheral pixels the gradation errors that occur with the block overall.
Figure 13B:
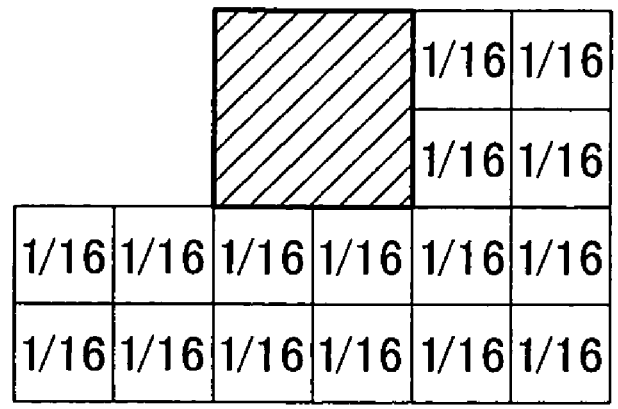

Once judgment of the dot on/off state is done for each pixel within the second block, the process is performed of diffusing to the peripheral pixels the gradation expression error that occurred within the block with the judgment (step S306). The method for obtaining the gradation expression error that occurred within the block is described later. FIG. 12 is an explanatory drawing that conceptually shows the situation of the error that occurred within the block being diffused to the peripheral pixels. The small squares shown in the figure represent pixels, and the large squares shown by dotted lines represent the second blocks. Blocks with cross hatching are blocks for which dot formation presence or absence has been judged. At step S308 of FIG. 10, the process is performed of distributing at a specified ratio toward the peripheral pixels the gradation expression error that occurred for that block overall. As an example, the ratio for distributing the error that occurred within the block to each peripheral pixel is shown by example in FIG. 13. FIG. 13A shows a case of distribution to six pixels adjacent to the block for which judgment was performed, and FIG. 13B shows a case of distribution to each pixel within the adjacent blocks to the block for which judgment was performed. The black arrow shown in FIG. 12 conceptually represents the situation of the error that occurred with the block being diffused to the peripheral pixels according to the ratio shown by example in FIG. 13A. The error diffused in this way is accumulated for each pixel and in a state correlated to each pixel, is stored in the RAM 106 of the computer 100.

Once diffusion of the error that occurred within the block is done as described above, a judgment is made of whether or not the process is completed for all pixels (step S308). Then, if unprocessed pixels remain (step S308: no), the process returns to step S300 to move the block position, and for each set second block, the series of processes described above is performed. When the process has ended for all the pixels in this way (step S308: yes), the halftone process shown in FIG. 10 ends, and the process returns to the image processing of FIG. 4.

Figure 14:
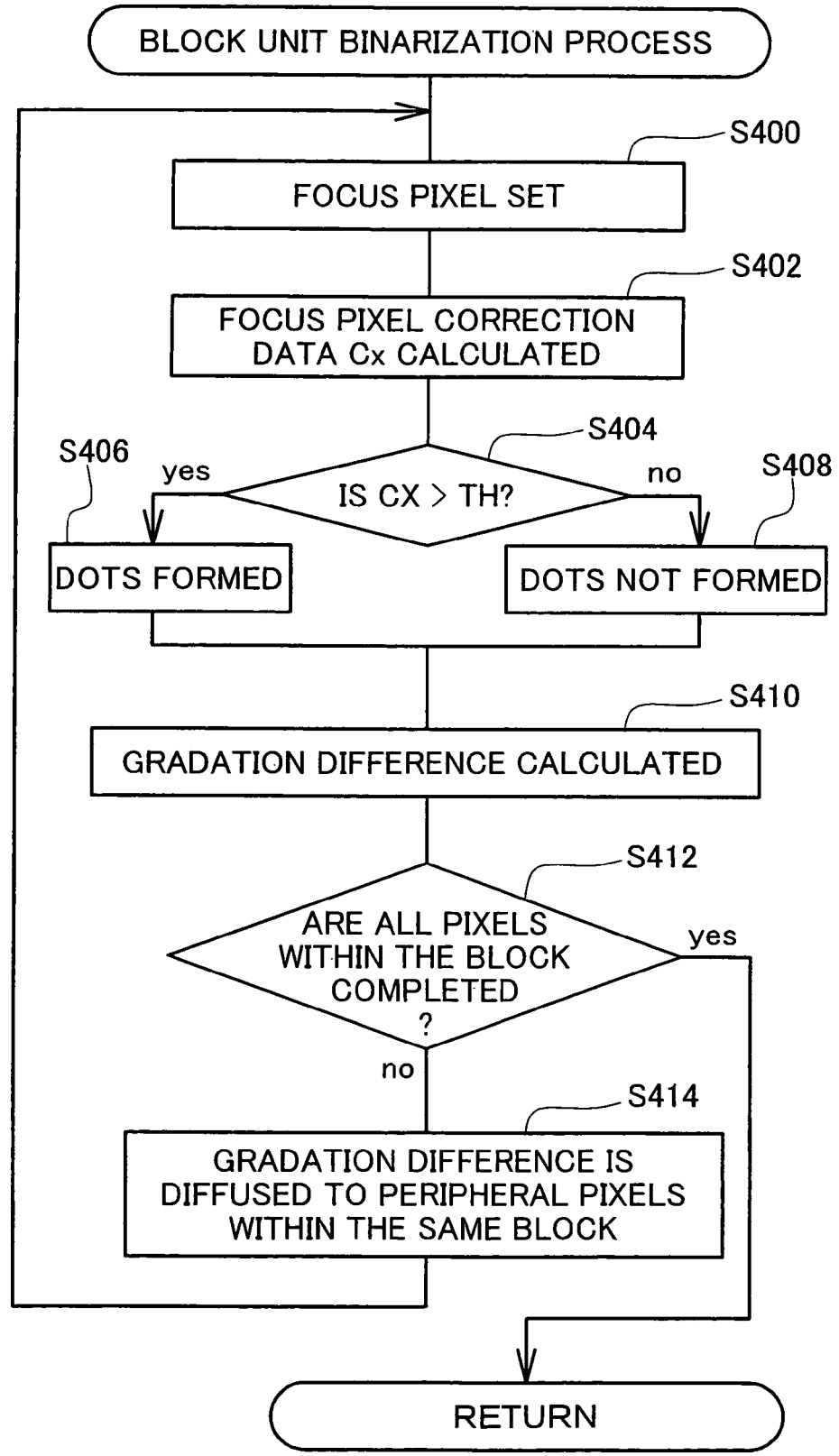
FIG. 14 is a flow chart showing the flow of the process of performing binarization for each pixel within a block during the halftone process performed in block units.

Following, the process for judging the dot on/off state for each pixel in block units (block unit binarization process) is described. FIG. 14 is a flow chart showing the flow of the process of judging the dot on/off state in block units during the halftone process of this embodiment.

When the block unit binarization process shown in FIG. 14 is started, first, one pixel (pixel of interest) is set for judging the dot on/off state from within the block to be processed (step S400). In other words, as described previously, a plurality of pixels is consolidated to make the second block, so with judgment of the dot on/off state one pixel at a time at a specified sequence for these pixels, one pixel of interest is selected. As shown in FIG. 11A, the second block bp is constituted from four adjacent pixels. Here, these four pixels are set such that the dot formation presence or absence is judged in the sequence of pixel Pa, pixel Pb, pixel Pc, pixel Pd from the pixel at the upper left within the block to the pixel at the lower right. In light of this, first, at step S400, the pixel Pa at the upper left corner is set as the pixel of interest.

Next, the correction data Cx is calculated (step S302) for the set pixel of interest (here, pixel Pa). The correction data Cx can be obtained by adding the image data of the pixel of interest and the error (diffusion error) diffused to the pixel of interest and storing this. For the image data for each pixel of the second block being processed, at step S302 in the halftone process shown in FIG. 10, compressed data stored in memory is read and already decompressed, and is stored in a register or cache built into the CPU 102. Also, the diffusion error for the pixel of interest is accumulated for each pixel and stored in step S306 of FIG. 10. At step S402 shown in FIG. 14, by adding the image data and the diffusion error for the pixel of interest, the process of calculating the correction data Cx is performed.

Once the correction data Cx of the pixel of interest Pa is calculated, the size relationship between the obtained correction data Cx and the specified threshold value th is judged (step S404). Then, if the correction data Cx is larger, then it is judged (step S406) that dots are formed on the pixel of interest (here, this is pixel Pa), and if that is not the case, it is judged that dots are not formed on the pixel of interest (step S408). The results of the judgment are stored in the RAM 106 as a variable indicating the judgment results for each pixel.

Once a judgment is made of the dot on/off state for the pixel of interest in this way, the gradation error that occurred for the pixel of interest with the judgment is calculated (step S410). The gradation error can be calculated by subtracting the gradation value expressed for the pixel of interest by whether dots are formed or dots are not formed (hereafter, this gradation value is called the result value) from the correction data Cx of the pixel of interest. If there is one type of ink concentration, then a minus error is normally calculated when dots are formed, and a plus gradation error is normally calculated when dots are not formed.

Once the gradation error that occurred with the pixel of interest is calculated, a judgment is made of whether or not the process has ended for all the pixels within the block being processed (step S412). Then, when there are unprocessed pixels remaining (step S412: no), the process is performed of diffusing the error to pixels peripheral to the pixel of interest among these unprocessed pixels (step S414). This process is described while referring to FIG. 15.

FIG. 15A to FIG. 15D are explanatory drawings that typically show the situation of judging the dot on/off state in block units by judging the dot on/off state after selecting one each of the pixel of interest from the pixels within the second block being processed. The four squares in the drawing respectively indicate the pixel Pa, the pixel Pb, the pixel Pc, and the pixel Pd that constitute the second block being processed. Also, the DTa shown in the square indicating the pixel Pa indicates the image data that is read and decompressed from the memory, and the EDa shown in the pixel Pa indicates the diffusion error diffused and accumulated in the pixel Pa. Similarly, the Dtb and EDb shown in the pixel Pb respectively indicate the image data and the diffusion error of the pixel Pb, and the DTc and EDc in the pixel Pc respectively indicate the image data and diffusion error EDc of the pixel Pc and the DTd and EDd in the pixel Pd indicate the image data and the diffusion error of the pixel Pd. As described above, after the image data of each of these pixels is read and decompressed from the RAM 106, it is stored in the register or the cache built into the CPU 102. Also, immediately after the start of the process for that block, the diffusion error of each pixel is stored in the RAM 106.

Figure 15A:
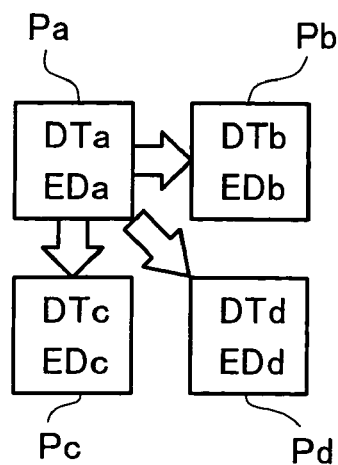
FIG. 15A to FIG. 15D are explanatory drawings that conceptually show the situation of performing binarization on each pixel within a block during the halftone process performed with block units.

As described previously, when the block unit binarization process starts, first, the pixel Pa at the upper left within the block is set as the pixel of interest (see step S400 of FIG. 14). Then, the correction data Cx for the pixel Pa is calculated, and by comparing with the threshold th, a judgment is made of the dot on/off state (see step S402 and S404 of FIG. 14). At the point that the dot on/off state is judged for the pixel Pa, as shown in FIG. 15A, the three pixels of pixel Pb, pixel Pc, and pixel Pd are left remaining as unprocessed pixels within the same block. In light of this, the gradation error that occurred with the pixel Pa is distributed evenly ⅓ each to these three pixels, and the process of adding these errors to the diffusion error stored in each pixel is performed. For example, as shown in FIG. 15A, if the diffusion error already stored in the pixel Pb is called EDb, then the gradation error that occurred with the pixel Pa is distributed with ⅓ of the gradation value to the pixel Pb, and added to the diffusion error EDb. As a result, the diffusion error EDb stored in the pixel Pb is updated to a new diffusion error EDb to which the error from the pixel Pa is added. The updated diffusion error is stored in the register or the cache of the CPU 102.

The same process is performed for the other pixel Pc and pixel Pd as well. Simply described, when the error from the pixel Pa is diffused to the pixel Pc, the diffusion error EDc stored in the pixel Pc and the error from the pixel Pa are added, and this is stored in the pixel Pc as a new diffusion error EDc. Also, similarly for the pixel Pd, the diffusion error EDd stored in the pixel Pd and the error from the pixel Pa are added, and this is stored in the pixel Pd as a new diffusion error EDd. The white arrows displayed from the pixel Pa to the other three pixels in FIG. 15A typically indicate the diffusion to these three pixels of the error that occurs with the pixel Pa. The diffusion error of each pixel for which the gradation error that occurred with the pixel Pa is diffused and updated in this way is stored in the register or the cache of the CPU 102. Moreover, the gradation error does not necessarily have to be distributed evenly to the peripheral unjudged pixels, but may also be distributed at a specified ratio to each pixel.

Once the gradation error that occurred with the pixel Pa as described above is diffused to the peripheral pixels within the block, the process of step S414 in FIG. 14 ends, the process returns to step S400, and the setting process is performed for a new pixel of interest. If the judgment for the dot on/off state being made for the pixel Pa is already made, at step S400, this time, setting is done with the pixel Pb which is adjacent to the right of the pixel Pa as the pixel of interest. Approximately the same process as the process described above is performed for the new pixel of interest set in this way. Following, a simple description is given focusing on the difference points with the process for the pixel Pa.

When performing processing for the pixel Pb, the same as with the pixel Pa, first, the correction data Cx is calculated (step S402). Here, the gradation error that occurred previously at the pixel Pa is diffused to the diffusion error EDb stored in the pixel Pb, and this is updated as the new diffusion error EDb. In light of this, by adding the image data DTb for the pixel Pb and the new diffusion error EDb for which the gradation error from the pixel Pa was diffused, the correction data Cx for the pixel Pb is calculated. Here, the image data DTb and the diffusion error EDb are both stored in the register or the cache within the CPU 102, so it is possible to read extremely quickly and calculate the correction data Cx. The size relationship between the correction data Cx calculated in this way and the specified threshold value th is judged (step S404), and when the correction data Cx is bigger, it is judged that dots are formed at the pixel Pb (step S406), and when this is not the case, then it is judged that dots are not formed at the pixel Pb (step S408). Next, the gradation error that occurred at the pixel Pb is calculated (step S410). The same as with the pixel Pa, the gradation error can be calculated by subtracting the results value from the correction data Cx of the pixel Pb.

Once the gradation error that occurred with the pixel of interest Pb is calculated, a judgment is made of whether or not the processing has ended for all the pixels within the second block being processed (step S412), and when unprocessed pixels remain, the process of diffusing the calculated gradation error to these unprocessed pixels is performed (step S414). As described previously, since judgment has already ended for the pixel Pa within the block, the two pixels Pc and Pd remain as the unjudged pixels. In light of this, the gradation error that occurred with the pixel Pb is diffused to these two pixels. The process of diffusing the error from the pixel Pb is described while referring to FIG. 15B.

Figure 15B:
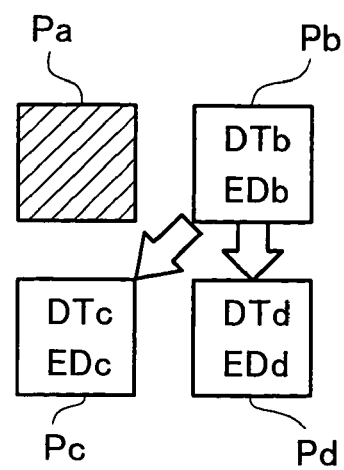

FIG. 15B is an explanatory drawing that conceptually shows the situation of the gradation error that occurred with the pixel Pb being diffused. In the drawing, the diagonal lines in the pixel Pa show a typical indication of the fact that the judgment of the dot on/off state has already been done for the pixel Pa. At the point that the judgment of the dot on/off state for the pixel Pb is made, the two pixels Pc and Pd remain as the unjudged pixels within the processing block. In light of this, as shown in FIG. 15B, the gradation error that occurred with the pixel Pb is diffused half at a time to these pixels Pc and Pd. In the drawing, the white arrows extending toward the pixels Pc and Pd from the pixel Pb show a typical indication of the fact that the gradation error that occurred with the pixel Pb is being diffused to these pixels. As a result of error diffusion in this way, the diffusion error of each pixel is updated to a new diffusion error for which diffused error is added, and this is stored in the register or the cache of the CPU 102. Moreover, here as well, the diffusion of the gradation error is done evenly to the unjudged pixels within the processing block, but of course, they do not have to be diffused evenly, and error may also be diffused at a specified ratio.

Figure 15C:
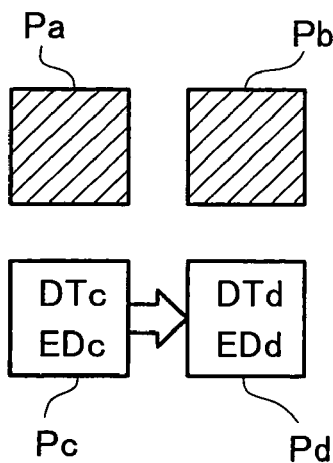

If the gradation error that occurred with the pixel Pb is diffused to peripheral pixels in this way, the process again returns to the step S400 in FIG. 14, and this time, after moving the pixel of interest to the pixel Pc, the same process is performed for the pixel of interest Pc. Following, this process is described while referring to FIG. 15C. When processing starts for the pixel Pc, first, the image data DTc of the pixel Pc and the diffusion error EDc are added and the correction data Cx is calculated. Here, at the point that the judgment of the dot on/off state for the pixel Pc starts, the diffusion error EDc of the pixel Pc is added to the originally stored diffusion error, the error from the pixel Pa and the error from the pixel Pb are added, and this is updated as a new diffusion error EDc and stored in the register or the cache of the CPU 102. From this, when calculating the correction data Cx of the pixel Pc, a new diffusion error EDc is calculated for the image data DTc of the pixel Pc. By comparing the correction data Cx obtained in this way with the specified threshold value th, the dot on/off state for the pixel Pc is judged. At the point that the dot on/off state for the pixel Pc is judged in this way, the remaining unjudged pixels within the block being processed is only the pixel Pd as shown in FIG. 15C. In light of this, the gradation error that occurred with the pixel Pc is all diffused to the pixel Pd, this is added to the diffusion error originally stored in the pixel Pd, and this is updated as a new diffusion error EDd.

Once the gradation error that occurred with the pixel of interest Pc is diffused, the process returns to step S400 of FIG. 14, and after moving the pixel of interest to the pixel Pd, the judgment of the presence of absence of dot formation for the pixel Pd starts. Specifically, the diffusion error EDd stored in the pixel Pd and the image data DTd of the pixel Pd are added and the correction data Cx is calculated (step S402). Next, the correction data Cx and the threshold value th are compared (step S404), and when the correction data Cx is bigger, it is judged that dots are formed on the pixel Pd (step S406), and when that is not the case, it is judged that dots are not formed on the pixel Pd (step S408).

Figure 15D:
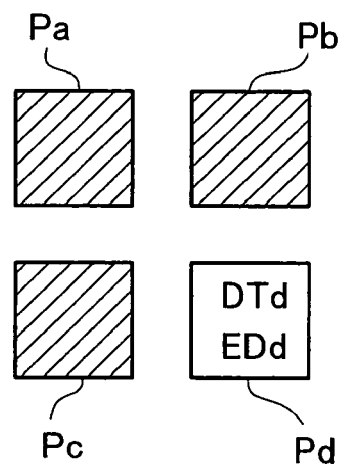

When the dot on/off state for the pixel Pd is judged in this way, after the gradation error that occurred with the pixel Pd is calculated (step S410), a judgment is made of whether or not the processing has ended for all the pixels within the block being processed (step S412). As shown in FIG. 15D, at the point that the process for the pixel Pd starts, there are already no unjudged pixels remaining within the block being processed, and after the judgment for the pixel Pd has ended, at step S412, it is judged that the processing for all the pixels within the block has ended. In light of this, the block unit binarization process shown in FIG. 14 ends, and the process returns to the halftone process that is performed in block units described previously using FIG. 10. As described previously, with the halftone process shown in FIG. 10, when the process returns from the block unit binarization process, the process of diffusing the gradation error that occurred with the processed second block to the peripheral blocks is performed (step S306 of FIG. 10).

Here, as the gradation expression error that occurred with the processed second block, it is possible to use the value of the gradation error obtained for the pixel Pd at step S410 of the block unit binarization process. This is because since the judgment of the dot on/off state is performed while diffusing the gradation error that occurred with the pixel of interest to the unjudged pixels within the block, the gradation error that occurred within the block accumulates as the diffusion error EDd in the finally judged pixel Pd. Following, a detailed description is given while referring to FIG. 15A through FIG. 15D.

The gradation error that occurred with the pixel Pa is diffused to three pixels within the block being processed, the pixel Pb, the pixel Pc, and the pixel Pd. When judging the dot on/off state of the pixel Pb, the error from the pixel Pa is considered, and the dot on/off state is judged to eliminate the error that is diffused in the pixel Pb as much as possible. Let's say that it is possible to eliminate the error that is diffused in the pixel Pb by judging the dot on/off state for the pixel Pb. In this case, new gradation error does not occur at the pixel Pb, and the error diffusion from the pixel Pb to the pixel Pc and the pixel Pd also does not occur. Similarly for the other two pixels Pc and Pd, by judging the dot on/off state, if it is possible to eliminate the error diffused to the respective pixels, then gradation error does not occur with these pixels. As a result, in this case, the gradation error that occurred with the pixel Pa is eliminated with the peripheral unjudged pixels Pb, Pc, and Pd, and it is possible to avoid the occurrence of gradation error for the entire processed block.

Here, by judging the dot on/off state of the pixel Pb, the error of the pixel Pb was eliminated, but when new gradation error occurs with the pixel Pb, this error is diffused to the peripheral unjudged pixels Pc and Pd, and as a result, the gradation error that occurred with the pixel Pa and the gradation error that occurred with the pixel Pb is diffused to these pixels. However, by judging the dot on/off state for these pixels Pc and Pd, if it is possible to eliminate the error that is diffused to the respective pixels, then gradation error still does not occur when looking at the overall block.

By judging the dot on/off state for the pixel Pc, even when it is not possible to eliminate the diffusion error diffused to the pixel Pc, in exactly the same way, if it is possible to eliminate the error for the pixel Pd, then gradation error will not occur for the block as a whole. To say this another way, the remaining error that could not be eliminated with the pixel Pd becomes the gradation error that occurred with the block overall. In this way, when the dot on/off state is judged while diffusing the gradation error that occurred with the pixel of interest to the unjudged pixels within the block, the remaining gradation errors that are not eliminated with each pixel are collected at the successive pixels, so the gradation error that occurred with the pixel Pd judged last within the block can be used as the gradation error that occurs with the overall block being processed.

Moreover, with the description above, the value of the gradation error that occurred with the pixel Pd for which the dot on/off state is judged last within the block being processed was used as the gradation error that occurred with the block overall, but of course, it is also possible to calculate the gradation error for each pixel that constitutes the block, and to use the sum of these gradation errors as the gradation error for the block overall.

Also, when judging the dot on/off state of each pixel constituting the second block with the example shown in FIG. 15A to FIG. 15D, the judgment was performed in the sequence of the pixel Pa, the pixel Pb, the pixel Pc, and the pixel Pd, but it is not necessary to judge in this sequence, and it is also possible to judge the dot on/off state in the sequence of the pixel Pa, the pixel Pc, the pixel Pb, and the pixel Pd, for example. For the sequence for setting the pixel of interest within the second block, it is possible to select a sequence for which it is possible to obtain good image quality.

As described above, with the image processing of this embodiment, whether or not there is an edge within the second block is detected based on the post-color conversion image data. Then, the image data is compressed according to the presence or absence of an edge, and the image data after compression is stored once in memory. With the succeeding halftone process, the necessary image data is read from the memory, and the halftone process is performed in block units. If the halftone process is performed using block units, it is possible to rapidly perform the error diffusion process or the process of calculating the correction data Cx judging the presence or absence of data formation for each pixel within the block, so it is possible to accelerate the halftone process.

Also, when performing the halftone process in block units, it is easy for the process to become more complex, but with this embodiment, the image data is compressed and stored in the memory, and when necessary, this is read and the halftone process is performed. If the halftone process is done while reading the necessary data in this way, it is possible to effectively avoid the process becoming more complicated.

In addition, the image data for which halftone processing is done (image data after color conversion) is compressed, so it is possible to perform both the operation of writing to the memory and the operation of reading from the memory extremely quickly. Furthermore, with the image process of this embodiment, the image data is compressed according to the presence or absence of an edge within the block, so it is possible to perform image data compression and decompression extremely rapidly and efficiently. Specifically, when an edge is not detected within the block, when compressing and decompressing image data by representing the gradation value of each pixel within the block using an average gradation value, the average gradation value is set for each pixel. Also, when an edge is not detected within the block, image data is not compressed. Even if compression is not performed when an edge is not detected in this way, it is possible to secure sufficient compression efficiency for practical use as the overall image data. This is because as long as the block is not set to be excessively large, there will not be that many blocks for which an edge is detected, and there is high compression efficiency for the blocks for which an edge is not detected. Because compression and decompression is done according to the presence or absence of an edge in this way, it is possible to do compression and decompression very rapidly.

As described above, with the image processing of this embodiment, it is possible to improve the processing speed for the overall image process without making the process more complex.

C. Second Embodiment

With the first embodiment described above, edge detection was performed based on the post-color conversion image data. However, by detecting the edge based on the image data before color conversion, it is possible to use a more simple process for detecting the edge. Following, a second embodiment like this is described.

Figure 16:
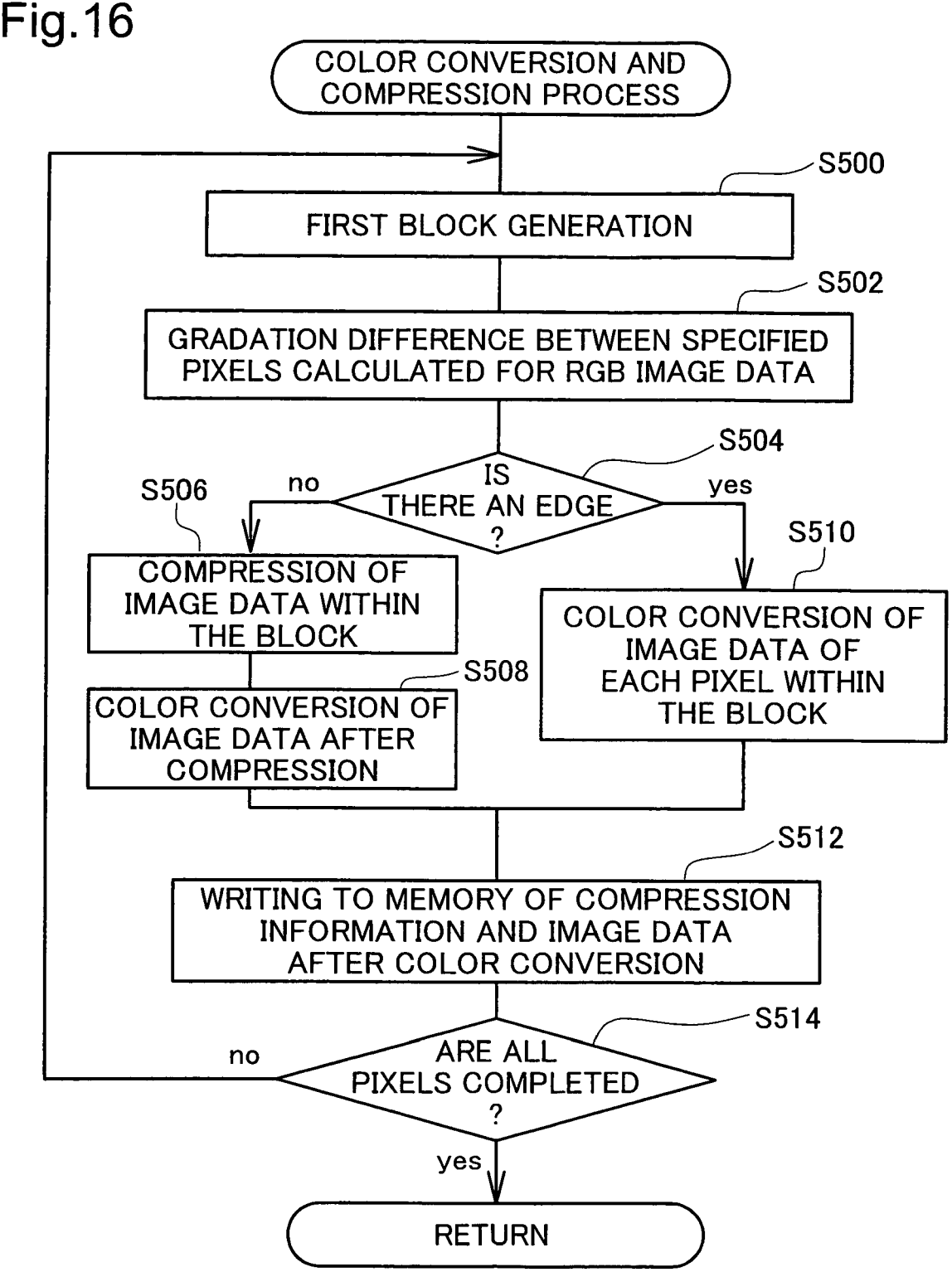
FIG. 16 is a flow chart showing the flow of the color conversion and compression process of the second embodiment.

FIG. 16 is a flow chart showing the flow of the color conversion and compression process of the second embodiment. Following is a description focusing on the difference points with the first embodiment while referring to the flow chart.

With the second embodiment as well, when the color conversion and compression process starts, first, adjacent pixels are consolidated a specified plurality at a time to generate the first block (step S500). Here, the same as described previously with the first embodiment, as shown in FIG. 6A, the first block is described as being constituted by four pixels aligned two each vertically and horizontally.

Once the first block is generated, the process of calculating the gradation difference of the RGB image data for each pixel between specified pixels within the block is performed (step S502). Specifically, as shown in FIG. 8A, the gradation difference for each RGB color is calculated respectively between the pixel Pa and the pixel Pb, between the pixel Pa and the pixel Pc, and between the pixel Pa and the pixel Pd. With the color conversion and compression process of the first embodiment described above, the gradation difference for each color C, M, Y, and K obtained by color converting the RGB image data in this way was calculated, but with the second embodiment, the fact that the gradation difference is calculated for each color RGB before color conversion is the big difference.

The process of judging the presence or absence of an edge within the block is performed based on the gradation difference calculated in this way (step S504). If there is even one item that is larger than the specified threshold value among the gradation difference of each color RGB calculated between specified pixels at step S502, it is judged that an edge is contained in that block. Conversely, when any of the gradation differences is smaller than the threshold value, it is judged that an edge is not contained in that block.

Then, when an edge is not contained (step S504: no), the RGB image data within the block is compressed (step S506), and the compressed RGB image data is color converted to image data of each color CMYK (step S508). Compression of the RGB image data is performed by calculating the average value of the image data for each pixel contained in the first block for each of the colors. For example, if the gradation values of the R image data of the pixels Pa, Pb, Pc, and Pd within the block are respectively called Ra, Rb, Rc, and Rd, the R image data is compressed to the gradation value Rave. Here, $$Rave=(Ra+Rb+Rc+Rd)/4$$

Similarly for the G image data and the B image data, with the gradation values of the G image data of each pixel Pa, Pb, Pc, and Pd within the block as Ga, Gb, Gc, and Gd, and with the gradation values of the B image data as Ba, Bb, Bc, and Bd, the G image data is compressed to the gradation value Gave, and the B image data is compressed to the gradation value Bave. Here, Gave and Bave are obtained respectively as Gave=(Ga+Gb+Gc+Gd)/4

Bave=(Ba+Bb+Bc+Bd)/4

Next, at step S508, color conversion is done for the RGB image data compressed in this way (Rave, Gave, Bave) while referring to the LUT shown in FIG. 7. With the second embodiment, when there is no edge within the first block, color conversion is done after compressing the RGB image data in this way, and it is possible to do color conversion rapidly without having to perform color conversion for each pixel. Also, for blocks in which there is no edge, since the RGB image data between pixels has about the same gradation value, even the gradation value of each color CMYK obtained by color converting the RGB image data for each pixel is thought to be about the same gradation value. Therefore, for this kind of block, even when color conversion is done for compressed RGB image data, there is almost no degradation of the image quality.

Meanwhile, when it is judged that there is an edge within the block at step S504 (step S504: yes), for each pixel contained in that block, the RGB image data is color converted to CMYK image data (step S510).

Moreover, with the description above, all the gradation differences between specified pixels within the block were calculated once for each color (step S502), and after that at step S504, the calculated gradation difference and the threshold value were compared to detect the presence or absence of an edge. However, this was to try to simplify the description considering ease of understanding, and it is not absolutely necessary to calculate all the gradation differences within the block. Specifically, if even one gradation difference that exceeds the specified threshold value is found, it is possible to judge that there is an edge in that block without calculating for the other gradation differences, and to perform the process of step S510.

Once the compressed RGB image data or the uncompressed RGB image data color conversion has ended as described above, the image data of each obtained CMYK color is stored together with compression information in the memory, specifically, RAM 106 (step S512). For the compression information, when there is no edge in the first block (when the compressed RGB image data is color converted), the value "1" representing the fact that the image data is compressed is stored. Conversely, when there is an edge in the first block, the value "0" representing the fact that the image data is not compressed is stored as the compression information.

Moreover, with the first embodiment described above, edge detection and image data compression are performed for each of the colors C, M, Y, and K, so even within the same block, it is possible for there to be different compression status for different colors. Because of this, the compression information is set and stored for each block and then for each color. In relation to this, with the second embodiment, the edge detection and compression are performed in block units, so if it is the same block, the compression status is the same for any of the colors CMYK. Therefore, it is possible to set and store compression information one at a time for each block.

Once the processing for one block in this way is completed, a judgment is made of whether or not there are unprocessed pixels remaining (step S514). Then, if there are unprocessed pixels remaining (step S514: no), the process returns to step S500 and a new block is generated, and the series of processes continues to be performed for each pixel within this block. Once the processing is completed for all the pixels in this way (step S514: yes), the color conversion and compression process of the second embodiment shown in FIG. 16 ends, and the process returns to the image processing of FIG. 4.

For this kind of color conversion and compression processing of the second embodiment, for blocks in which there is no edge, color conversion may be done only once. Therefore, it is possible to accelerate the processing more than is possible with the color conversion and compression processing of the first embodiment for which color conversion is done for all the pixels within the block. Also, when doing the edge detection as well, the gradation difference is calculated for each color RGB, and when even one gradation difference bigger than the threshold value is found, it is possible to start the next process without calculating the remaining gradation differences. For this point as well, the color conversion and compression process of the second embodiment makes it possible to accelerate the process more than is possible with the color conversion and compression process of the first embodiment.

D. Third Embodiment

With the color conversion and compression process of the second embodiment described above, image data is compressed only when any of the gradation differences for the colors RGB are small between pixels within the block. By working in this way, it is possible to make the image processing faster than with the first embodiment, but on the other hand, there is a tendency for the compression rate when viewed as the overall image data to be smaller. If the compression rate becomes too small, it takes time to read and write the image data to the memory, specifically, the RAM 106, and thus there is concern that the processing speed will decrease. To avoid this kind of possibility, it is effective to compress the image data before and after color conversion. Following, the color conversion and compression process of this kind of third embodiment is described.

Figure 17:
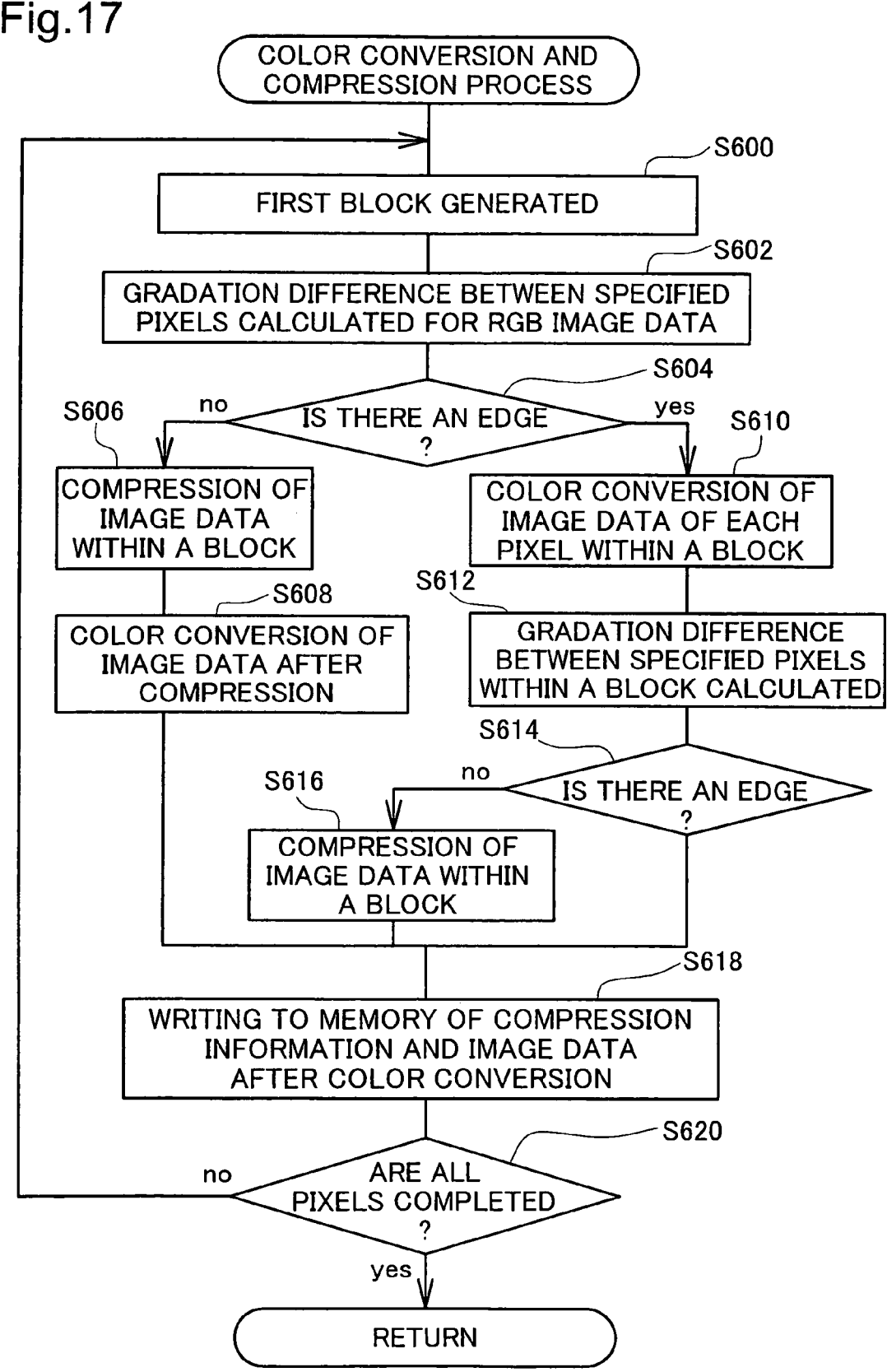
FIG. 17 is a flow chart showing the flow of the color conversion and compression process of the third embodiment.

FIG. 17 is a flow chart showing the flow of the color conversion and compression of the third embodiment. Following, a description is given focusing on the difference points with the first embodiment and the second embodiment while referring to the flow chart.

With the third embodiment as well, when the color conversion and compression processing starts, first, adjacent pixels are consolidated a specified plurality at a time, and the first block is generated (step S600). Here as well, the same as with each of the embodiments described previously, the first block is described as being constituted by four pixels aligned two each vertically and horizontally as shown in FIG. 6A.

Once the first block is generated, the gradation difference of the RGB image data for each pixel is calculated between specified pixels within the block (step S602), and the process of detecting the edge is performed (step S604). This process is the same as the steps S502 and S504 of the second embodiment. Following, with only a summary description, first, the gradation difference between each color RGB is calculated between specified pixels within the block, and this is compared with the specified threshold value. Then, when a gradation value larger than the threshold value is found, it is judged that an edge is contained in that block. Conversely, for blocks for which it is confirmed that all the gradation differences are smaller than the threshold value, it is judged that no edge is contained.

When it is judged that there is no edge within the block (step S604: no), the same as with the second embodiment described previously, the RGB image data within the block is compressed (step S606), and color conversion is performed on the compressed RGB image data (step S608).

Meanwhile, when it is judged that there is an edge within the block (step S604: yes), the RGB image data of each pixel is color converted from the image data of the colors C, M, Y, and K (step S610). Next, the same as with the color conversion and compression process of the first embodiment, the gradation difference between specified pixels within the block is calculated for each color (step S612), and a judgment of the presence or absence of an edge within the block is made for each color (step S614). Specifically, if any of the gradation differences between the specified pixels are smaller than the specified threshold value, it is judged that there is no edge within the block for that color. Conversely, when there is a gradation difference that is larger than the threshold value, it is judged that an edge is contained within the block for that color.

As a result of detecting the presence or absence of an edge for the block in this way, for colors for which it is judged that an edge is not contained (step S614: no), the process of compressing image data within the block is performed (step S616). For the image data compression, the same as with the first embodiment described previously, for the color to be compressed, the average gradation value of each pixel within the block is calculated, and the gradation value of each pixel is represented by the average gradation value. Meanwhile, for the colors for which it is judged that an edge is contained within the block, the process for compressing the image data within the block is skipped.

As described above, the presence or absence of an edge within the block is detected, and once the process of compressing the image data according to the presence or absence of an edge is performed, the process of writing these image data together with the compression information to the memory, specifically, the RAM 106, is performed (step S618). For the compression information, "1" is written for colors for which the image data is compressed, and "0" is written for colors for which it is not compressed.

When the process for one block in this way is completed, a judgment is made of whether or not there are unprocessed pixels remaining (step S620). Then, if there are unprocessed pixels remaining (step S620: no), the process returns to step S600 and new blocks are generated, and the series of processes continues to be performed for each pixel within this block. When the processing for all the pixels is completed in this way (step S620: yes), the color conversion and compression processing of the third embodiment shown in FIG. 17 is completed, and the process returns to the image processing of FIG. 4.

For the color conversion and compression processing of the third embodiment described above, the presence or absence of an edge is detected based on the image data before color conversion, and for blocks that do not contain an edge, color conversion is done after the RGB image data is compressed. In this way, if color conversion is done after compression, it is possible to perform color conversion once, so it is possible to perform the color conversion and compression processing quickly.

Also, for the blocks for which an edge is detected, after color conversion is done for each pixel, the presence or absence of an edge is detected for each color. Then, for colors for which an edge is not detected, the image data is compressed. By working in this way, it is only the blocks for which an edge was detected before color conversion for which it is necessary to detect the presence or absence of an edge for each color for the image data after color conversion and perform compression, so it is possible to rapidly perform color conversion and compression processing. In addition, for these blocks, the presence or absence of an edge is detected for each color and compression is performed, so the same as with the first embodiment, it is possible to secure sufficient compression efficiency.

E. Variation Examples

Following, a simple description is given of variation examples of the various embodiments described above.

Figure 18A:
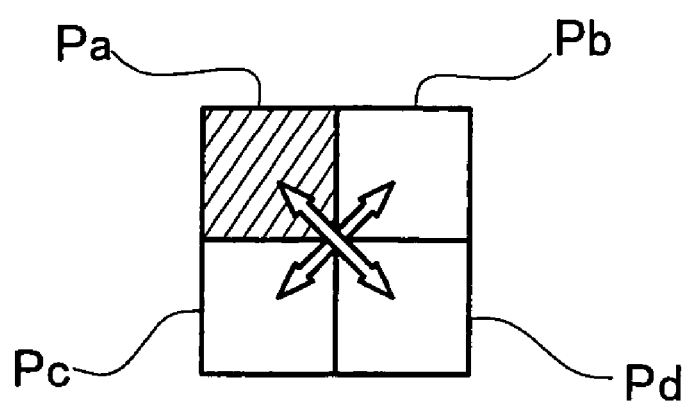
FIG. 18A to FIG. 18B are explanatory drawings that conceptually show variation examples of performing compression while detecting an edge within a block.
Figure 18B:
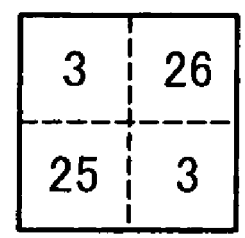

(1) First Variation Example:

With the various embodiments described above, to detect the presence or absence of an edge within the block, the gradation difference was detected between specified pixels shown in FIG. 8. It is reasonable that the gradation difference detected for detecting an edge is not limited to the gradation difference between specified pixels shown in FIG. 8. For example, as shown in FIG. 18A, it is also possible to detect the gradation difference between the pixel Pa and the pixel Pd, and the gradation difference between the pixel Pb and the pixel Pc. By working in this way, for example as shown in FIG. 18B, as long as the fine edge of one pixel width is not cut across diagonally within a block, it is possible to correctly detect an edge within the block simply by detecting two gradation differences.

(2) Second Variation Example:

With the various embodiments described above, described were cases such that when the image data within the block is compressed, first, the average gradation value of each pixel within the block is calculated, and the gradation values of each pixel are compressed to the average gradation value. However, for convenience, instead of the average gradation value, it is also possible to compress the gradation value of one pixel within the block. Again, describing this using FIG. 18A, when an edge is not detected within the block, with the gradation value of the pixel Pa with diagonal lines shown in the drawing, it is also possible to replace the gradation value of another pixel within the block. For blocks for which there is no edge, because the gradation value of each pixel has a very close value, it is possible to replace the average gradation value with the gradation value of one pixel. For the pixels used instead of the average gradation value for the gradation value, it is possible to use the pixel of a specified position within the block or to select any pixel.

(3) Third Variation Example:

With the various embodiments described above, described were cases of judging only whether or not an edge is contained within the block, the image data is compressed when there is no edge contained, and compression is not done when an edge is contained. Specifically, the image data compression state was described as whether or not it is compressed or not compressed, with the state being one or the other. However, it is also possible to judge not only the presence or absence of an edge but also the edge direction, and to switch the compression state according to that.

Figure 19A:
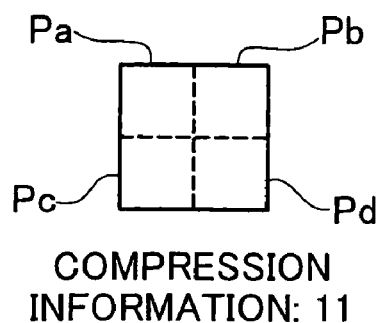
FIG. 19A to FIG. 19D are explanatory drawings showing variation examples of compressing image data while dividing blocks into sub-blocks according to the edge status.

FIG. 19A to FIG. 19D are explanatory drawings showing examples of the situation of switching the various compression states by the edge direction. FIG. 19A shows a case when an edge is not contained in the block. In this case, the same as with the various embodiments described above, the image data of each pixel is compressed to one gradation value. Also, with the various embodiments described previously, only two states could be used for the compression state, so 1 bit of data was sufficient for the compression information, but since four compression states are used with the cases shown in FIG. 19A to FIG. 19D, the compression information is 2 bits of data. In light of this, the value "11" is stored as the compression information for the blocks not containing an edge.

Figure 19B:
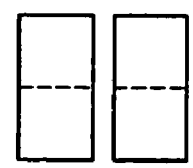

Also, the gradation difference between two pixels aligned in the vertical direction, specifically, the gradation difference between the pixel Pa and the pixel Pc, and the gradation difference between the pixel Pb and the pixel Pd are both small, but when the gradation difference between pixels in the horizontal direction or the diagonal direction are not necessarily small, this is thought to have the edge within the block running in the vertical direction. In light of this, in this kind of case, as shown in FIG. 19B, one block is thought of as divided into two sub-blocks and the image data is compressed for each sub-block. Also, the compression information at this time is stored as "10."

Figure 19C:
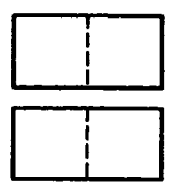

Furthermore, when the gradation difference between the two pixels aligned horizontally is small, but the gradation difference between the pixels in the vertical direction or the diagonal direction is not necessarily small, it is thought that the edge runs in the horizontal direction within the block. In light of this, in this kind of case, one block is divided into two sub-blocks as shown in FIG. 19C, and image data is compressed for each sub-block. At this time, the compression information is stored as "01."

Figure 19D:
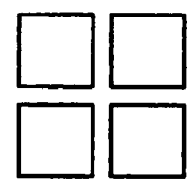

Then, when neither case applies, as shown in FIG. 19D, the image data is not compressed and is stored in the memory as is. Also, the compression information at this time is stored as "00" indicating that the image data is not compressed.

In this way, not only the presence or absence of an edge within the block, but also the direction the edge runs in is detected, and if the image data is compressed according to this, it is possible to even further improve the image data compression efficiency. Also, even in a case when this kind of compression is performed, the same as with the various embodiments described above, it is possible to rapidly perform image data compression and decompression processing. Because of this, the reading and writing operation to memory of the image data after color conversion is further accelerated, and it is possible to perform processing even faster as the overall image process.

(4) Fourth Variation Example:

With the halftone process described using FIG. 14 and FIG. 15, even in a case using any kind of gradation value by each pixel constituting the block, the processing contents were described as exactly the same. However, even within the block, between pixels compressed as not containing an edge, this is thought of as using approximated gradation values. In particular, as shown in FIG. 9, when the gradation values of a plurality of pixels for a block that does not contain an edge is compressed as a single gradation value, the gradation value of each decompressed pixel is the same value. In this way, for pixels compressed as not containing an edge, this is thought of as having approximated (or the same) gradation values, so using this, it is possible to accelerate the processing.

For example, there are cases of dividing the use of a dither matrix according to the gradation value of the image data for the halftone process using the dither method, or cases of changing the threshold value used with the error diffusion method according to the image data gradation value. Also, with the error diffusion method, there are also cases of performing a process of switching the error diffusion matrix according to the image data gradation value. If it is known that the gradation values are approximated or the same for a plurality of pixels, it is possible to make the process of changing the matrix or the threshold value easy.

Above, each type of embodiment was described, but the present invention is not limited to all the embodiments noted above, and it is possible to implement various aspects within a scope that does not stray from the key points. For example, it is also possible to supply a software program for realizing the functions described above (application program) to the main memory or the external storage device of a computer system via a communication line and executing this. Of course, it is also possible to read the software program stored in the CD-ROM or flexible disk and execute it.

Also, with the various embodiments described above, the image data conversion process containing the halftone process was described as being executed within a computer, but part or all of the image data conversion process may also be executed on the printer side or using an exclusive image processing device.

With the present invention, the image display device is not limited to a printing device for printing an image by forming ink dots on a printing medium, but may also be, for example, used as a liquid crystal display device for expressing images by consecutively changing the gradations by diffusing bright points at a suitable density on the liquid crystal display screen. Also, the printer is not limited to being used as that itself, but may also be used for a facsimile device or scanner printer copier, or a copy machine or the like.

What is claimed is:

1. An image processing device for converting color image data expressed by a first color system to image data expressed by a second color system representing each pixel data as a dot on/off state for each color, the image processing device comprising:
   a color conversion unit that converts color image data expressed by the first color system to color image data expressed by the second color system;
   an edge detection unit that detects whether or not an edge exists in a first type of block into which specified adjacent pixels are grouped;
   a compressed data storage unit that compresses the color image data of pixels contained in the first type of block and stores the compressed color image data in a memory when the edge detection unit detects that no edge exists in the first type of block;
   a data decompression unit that decompresses the compressed color image data read from the memory to color image data of each pixel and groups specified adjacent pixels into a second type of block; and
   a dot formation judgment unit that judges in block units for each color of the second color system the dot on/off state for each pixel contained in the block based on the decompressed color image data of pixels grouped into the second type of block.

2. The image processing device according to claim 1, wherein
   the dot formation judgment unit handles the color image data of each pixel grouped as the second type of block as uniform image data and judges the dot on/off state for pixels using the uniform image data, the case where the color image data of pixels are not compressed because of no edge detection in the block.

3. The image processing device according to claim 1, wherein
   the edge detection unit detects the edge within the first type of block based on the color image data after the color conversion for each pixel within the block; and
   the compressed data storage unit stores the compressed data in the memory after the converted color image data is compressed according to a result of the edge detection within the first type of block.

4. The image processing device according to claim 1, wherein
the edge detection unit detects the edge within the first type of block based on the color image data before the color conversion for each pixel within the block; and
the compressed data storage unit, after compression of color image data of pixels contained in the first type of block for which the color conversion is not performed and the edge is not detected, performs the color conversion of the compressed color image data to color image data of the second color system and stores the converted color image data in the memory.

5. The image processing device according to claim 4, wherein
the edge detection unit performs another edge detection based on the color image data after the color conversion for the first type of block for which the edge is detected based on the color image data before the color conversion; and
the compressed data storage unit compresses the image data after the color conversion according to the result of another edge detection for the first type of block and stores the compressed color image data in the memory.

6. The image processing device according to any of claims 1 through 5, wherein
the compressed data storage unit compresses the image data of pixels contained in the block to one pixel of image data for the first type of block in which no edge is detected and stores the compressed image data.

7. The image processing device according to claim 6, wherein
the compressed data storage unit compresses the image data of pixels contained in the block for the first type of block which no edge is detected to an average value of the color image data and stores the average data in a memory as compressed color image data.

8. The image processing device according to claim 6, wherein
the compressed data storage unit that compresses the image data of pixels contained in the block for the first type of block which no edge is detected to an image data of one pixel selected from within the block, and stores the image data as compressed color image data.

9. The image processing device according to any of claims 1 through 5, wherein
the compressed data storage unit that, when an edge is detected within the first type of block, divides that block into sub-blocks that do not contain edges, compresses image data after the color conversion for pixels contained in each sub-block, and stores the compressed color image data in the memory.

10. The image processing device according to any of claims 1 through 5, wherein
the compressed data storage unit that stores in the memory the color converted image data that is compressed according to the result of the edge detection together with compressed information expressing a state of the color image data being compressed.

11. The image processing device according to any of claims 1 through 5, wherein
the data decompression unit groups pixels contained in the first type of block as the second type of block.

12. The image processing device according to claim 11, wherein the edge detection unit and the data decompression unit respectively group the four pixels aligned in 2 rows and 2 columns as the first type of block and the second type of block.

13. An image processing device for converting color image data expressed by a first color system to image data expressed by a second color system representing each pixel data as a dot on/off state for each color, the image processing device comprising:
a color conversion unit that converts color image data expressed by the first color system to color image data expressed by the second color system;
an edge detection unit that detects whether or not an edge exists in a first type of block into which specified adjacent pixels are grouped;
a compressed data storage unit that compresses the color image data of pixels contained in the first type of block and stores the compressed color image data in a memory when the edge detection unit detects that no edge exists in the first type of block;
a data decompression unit that decompresses the compressed color image data read from the memory to color image data; and
a dot formation judgment unit that judges for each color of the second color system the dot on/off state based on the decompressed color image data.

14. An image processing method for converting color image data expressed by a first color system to image data expressed by a second color system representing each pixel data as a dot on/off state for each color, the image processing method comprising:
converting color image data expressed by the first color system to color image data expressed by the second color system;
detecting whether or not an edge exists in a first type of block into which specified adjacent pixels are grouped;
compressing the color image data of pixels contained in the first type of block and storing the compressed color image data in a memory when no edge is detected in the first type of block;
decompressing the compressed color image data read from the memory to color image data of each pixel and grouping specified adjacent pixels into a second type of block; and
judging in block units for each color of the second color system the dot on/off state for each pixel contained in the block based on the decompressed color image data of pixels grouped into the second type of block.

15. An image processing method for converting color image data expressed by a first color system to image data expressed by a second color system representing each pixel data as a dot on/off state for each color, the image processing method comprising:
converting color image data expressed by the first color system to color image data expressed by the second color system;
detecting whether or not an edge exists in a first type of block into which specified adjacent pixels are grouped;
compressing the color image data of pixels contained in the first type of block and storing the compressed color image data in a memory when no edge is detected in the first type of block;
decompressing the compressed color image data read from the memory to color image data; and
judging for each color of the second color system the dot on/off state based on the decompressed color image data.

16. A program product for realizing using a computer a method for converting color image data expressed by a first color system to image data expressed by a second color system representing each pixel data as a dot on/off state for each color, the program product comprising a computer-readable recording medium and a program recorded in the computer-readable recording medium, the program causing the computer to implement functions including:
- a function for color converting color image data expressed by the first color system to color image data expressed by the second color system;
- a function for detecting whether or not an edge exists in a first type of block into which specified adjacent pixels are grouped;
- a function for compressing the color image data of pixels contained in the first type of block and storing the compressed color image data in a memory when no edge is detected in the first type of block;
- a function for decompressing the compressed color image data read from the memory to color image data of each pixel and grouping specified adjacent pixels into a second type of block; and
- a function for judging in block units for each color of the second color system the dot on/off state for each pixel contained in the block based on the decompressed color image data of pixels grouped into the second type of block.

17. A program product for realizing using a computer a method for converting color image data expressed by a first color system to image data expressed by a second color system representing each pixel data as a dot on/off state for each color, the program product comprising a computer-readable recording medium and a program recorded in the computer-readable recording medium, the program causing the computer to implement functions including:
- a function for color converting color image data expressed by the first color system to color image data expressed by the second color system;
- a function for detecting whether or not an edge exists in a first type of block into which specified adjacent pixels are grouped;
- a function for compressing the color image data of pixels contained in the first type of block and storing the compressed color image data in a memory when no edge is detected in the first type of block;
- a function for decompressing the compressed color image data read from the memory to color image data; and
- a function for judging for each color of the second color system the dot on/off state based on the decompressed color image data.

* * * * *